United States Patent
Lee et al.

(10) Patent No.: US 10,679,628 B2
(45) Date of Patent: Jun. 9, 2020

(54) ELECTRONIC DEVICE AND METHOD OF OPERATING VOICE RECOGNITION FUNCTION

(71) Applicant: Samsung Electronics Co., Ltd., Gyeonggi-do (KR)

(72) Inventors: Taejin Lee, Gyeonggi-do (KR); Subhojit Chakladar, Gyeonggi-do (KR); Sanghoon Lee, Gyeonggi-do (KR); Kyungtae Kim, Gyeonggi-do (KR); Yuna Kim, Gyeonggi-do (KR); Junhui Kim, Seoul (KR); Eunhye Shin, Gyeonggi-do (KR); Jaegeun Lee, Seoul (KR); Hyunwoong Lim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 61 days.

(21) Appl. No.: 15/044,824

(22) Filed: Feb. 16, 2016

(65) Prior Publication Data
US 2016/0240194 A1 Aug. 18, 2016

(30) Foreign Application Priority Data

Feb. 16, 2015 (KR) .......................... 10-2015-0023702

(51) Int. Cl.
*G10L 15/32* (2013.01)
*G10L 15/30* (2013.01)
(Continued)

(52) U.S. Cl.
CPC ............ *G10L 15/32* (2013.01); *G06F 1/3206* (2013.01); *G06F 1/3293* (2013.01); *G10L 15/26* (2013.01);
(Continued)

(58) Field of Classification Search
CPC ....................................................... G10L 15/32
See application file for complete search history.

(56) References Cited

U.S. PATENT DOCUMENTS 8,311,973 B1  11/2012  Zadeh
8,666,751 B2  3/2014  Murthi et al.
(Continued)

FOREIGN PATENT DOCUMENTS

CN  103871409  6/2014
CN  103986839  8/2014
(Continued)

OTHER PUBLICATIONS

International Search Report dated May 23, 2016 issued in counterpart application No. PCT/KR2016/001470, 3 pages.
(Continued)

*Primary Examiner* — Matthew H Baker
(74) *Attorney, Agent, or Firm* — The Farrell Law Firm, P.C.

(57) ABSTRACT

Provided is an electronic device that includes a first processor for receiving an audio signal, performing first voice recognition on the audio signal, and transferring a driving signal to a second processor based on a result of the first voice recognition. The second processor performs second voice recognition based on a voice signal by the first voice recognition or the audio signal, in response to the driving signal.

20 Claims, 15 Drawing Sheets

(51) Int. Cl.
  *G10L 15/26* (2006.01)
  *G06F 1/3206* (2019.01)
  *G06F 1/3293* (2019.01)
(52) U.S. Cl.
  CPC ............ *G10L 15/30* (2013.01); *Y02D 10/122* (2018.01); *Y02D 50/20* (2018.01)

(56) References Cited

U.S. PATENT DOCUMENTS

| | | | |
|---|---|---|---|
| 9,508,345 | B1* | 11/2016 | Murgia .................. G10L 15/22 |
| 9,633,655 | B1* | 4/2017 | Santos .................. H04W 12/06 |
| 2013/0223635 | A1* | 8/2013 | Singer .................. H04R 1/1041 |
| | | | 381/56 |
| 2013/0289994 | A1* | 10/2013 | Newman .................. G10L 15/22 |
| | | | 704/254 |
| 2013/0325484 | A1 | 12/2013 | Chakladar et al. |
| 2014/0012573 | A1* | 1/2014 | Hung .................... G06F 1/3215 |
| | | | 704/233 |
| 2014/0136215 | A1 | 5/2014 | Dai et al. |
| 2014/0171037 | A1 | 6/2014 | Park |
| 2014/0214429 | A1* | 7/2014 | Pantel .................... G10L 21/16 |
| | | | 704/275 |
| 2014/0278416 | A1* | 9/2014 | Schuster ................ G10L 15/32 |
| | | | 704/246 |
| 2014/0278435 | A1 | 9/2014 | Ganong, III et al. |
| 2014/0297288 | A1* | 10/2014 | Yu ..................... H04M 1/72519 |
| | | | 704/275 |
| 2014/0358535 | A1 | 12/2014 | Lee et al. |
| 2014/0358552 | A1 | 12/2014 | Xu |
| 2015/0245154 | A1* | 8/2015 | Dadu ...................... G06F 3/167 |
| | | | 381/56 |
| 2015/0314454 | A1* | 11/2015 | Breazeal ................ B25J 9/0003 |
| | | | 700/259 |
| 2016/0027440 | A1* | 1/2016 | Gelfenbeyn ............ G10L 15/32 |
| | | | 704/244 |
| 2016/0063998 | A1* | 3/2016 | Krishnamoorthy ..... G10L 15/02 |
| | | | 704/254 |
| 2016/0156771 | A1 | 6/2016 | Lee |

FOREIGN PATENT DOCUMENTS

| | | |
|---|---|---|
| EP | 2 816 554 | 12/2014 |
| KR | 1020100032140 | 3/2010 |
| KR | 1020120066561 | 6/2012 |
| KR | 1020130133629 | 12/2013 |

OTHER PUBLICATIONS

European Search Report dated Jul. 4, 2016 issued in counterpart application No. 16155694.9-1901, 10 pages.

Chinese Office Action dated Apr. 7, 2020 issued in counterpart application No. 201680005400.9, 16 pages.

* cited by examiner

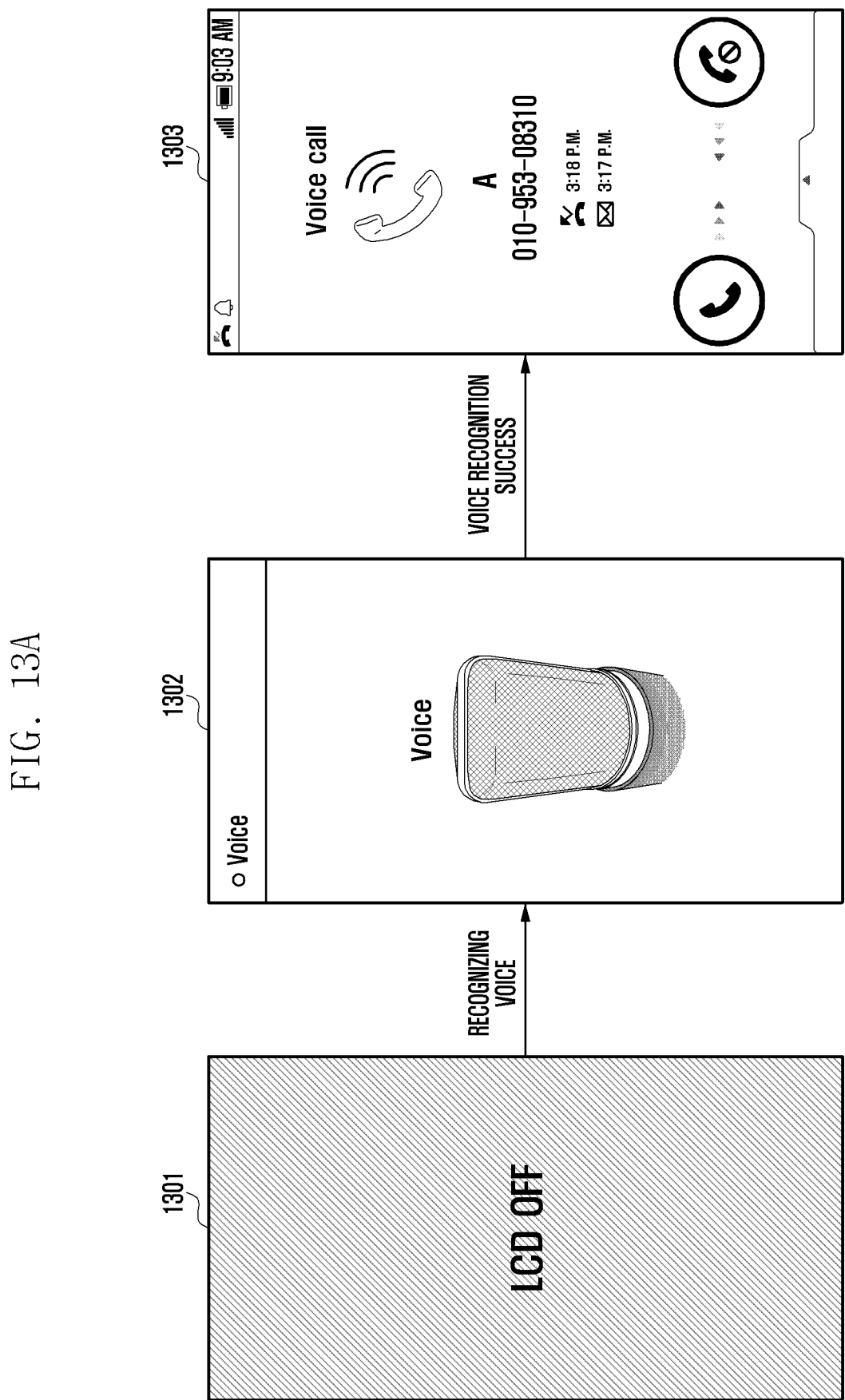

ELECTRONIC DEVICE AND METHOD OF OPERATING VOICE RECOGNITION FUNCTION

PRIORITY

This application claims priority under 35 U.S.C. § 119(a) to Korean Patent Application No. 10-2015-0023702, filed on Feb. 16, 2015, the contents of which are incorporated herein by reference.

BACKGROUND

1. Field of the Disclosure

The present disclosure generally relates to an electronic device and a method of voice recognition and, more particularly, to an improved voice recognition method and an electronic device utilizing the method.

2. Description of the Related Art

Due to the development of hardware and communication technologies, electronic devices are used in a wide range of fields and provide various functions which users require. In general, voice recognition technology is implemented in various electronic devices that include a voice input device, e.g., a microphone. Input utilizing voice recognition technology is gradually replacing a physical input and is being generalized to provide voice control of electronic devices.

Among voice recognition technologies, a scheme, i.e., a seamless voice recognition scheme, has been proposed to activate an electronic device based on a user voice input and executing a seamless voice command. Since the electronic device must at all times be ready to record a user's voice for the voice recognition, the seamless voice recognition scheme must continuously maintain a voice recognition system when in a standby state. The need to continuously maintain the system in the standby state to perform seamless voice recognition causes problems that include the following. If a low power chip is utilized to implement the voice recognition system to reduce current consumption, a voice recognition error rate increases due to limited memory and performance differences between system components. If a high performance chip is used to improve the voice recognition error rate, the high performance chip must always remain in an active state, thereby increasing current consumption losses.

SUMMARY

The present disclosure has been made to address the above-mentioned problems and disadvantages, and to provide at least the advantages described below. Accordingly, an aspect of the present disclosure provides an electronic device and a method of operating a voice recognition function, which minimizes errors in a voice recognition function in the electronic device, increases a recognition rate, and reduces current consumption while simultaneously increasing the efficiency of the voice recognition performance.

In accordance with an aspect of the present disclosure, an electronic device is provided that includes a first processor configured to receive an audio signal, perform a first voice recognition on the audio signal, and transfer a driving signal to a second processor based on a result of the first voice recognition; and the second processor configured to perform second voice recognition based on at least one of a voice signal by the first voice recognition and the audio signal in response to the driving signal.

In accordance with another aspect of the present disclosure, a method of performing voice recognition by an electronic device is provided that includes receiving an audio signal; performing first voice recognition on the audio signal, by a first processor; transferring a driving signal to a second processor based on a result of the first voice recognition, by the first processor; and performing second voice recognition based on at least one of a voice signal by the first voice recognition and the audio signal in response to the driving signal, by the second processor.

BRIEF DESCRIPTION OF THE DRAWINGS

The above and other aspects, features and advantages of the present disclosure will be more apparent from the following detailed description, taken in conjunction with the accompanying drawings, in which:

FIG. 13A provides an example of a voice recognition operation screen of the electronic device according to an embodiment of the present disclosure.

DETAILED DESCRIPTION OF EMBODIMENTS OF THE PRESENT DISCLOSURE

Hereinafter, embodiments of the present disclosure are described in detail with reference to the accompanying drawings.

In various embodiments, an "audio signal" includes a signal input from an audio input module by sound information, and a "voice signal" includes a voice signal extracted from the audio signal based on voice recognition.

In various embodiments, voice recognition includes at least one of keyword recognition of extracting and recognizing only a word to be recognized, command recognition of recognizing a speaker's voice as an execution command, and speaker recognition of recognizing a registered specific speaker's voice. The voice recognition may divisibly recognize a voice trigger, i.e., a trigger voice, for triggering a voice function and a voice command, i.e., a command voice, input to execute a function based on a voice after the voice trigger is recognized.

For example, the keyword recognition and the command recognition may be a speaker-independent recognition scheme that recognizes many unspecified voices, and the speaker recognition may be a speaker-dependent recognition scheme that recognizes a specific speaker voice. The keyword recognition may function by analyzing a voice sequence to identify a pattern of successive sounds and determine a word is uttered that corresponds to a keyword in the successive sounds of a voice pattern. The recognition for the keyword may be successful if there is a previously stored keyword, and the recognition may fail if there is no keyword. The speaker recognition may be a speaker verification function of determining a similarity between voice information on a registered speaker and a voice signal. The speaker recognition is successful when the voice input corresponds to the voice input of the registered speaker, and the speaker recognition fails when the voice input is not the voice signal of the registered speaker. For the speaker recognition, the electronic device may receive a voice of the registered speaker, extract features of the voice of the speaker, model the features, and store the features for later comparison.

Figure 1:
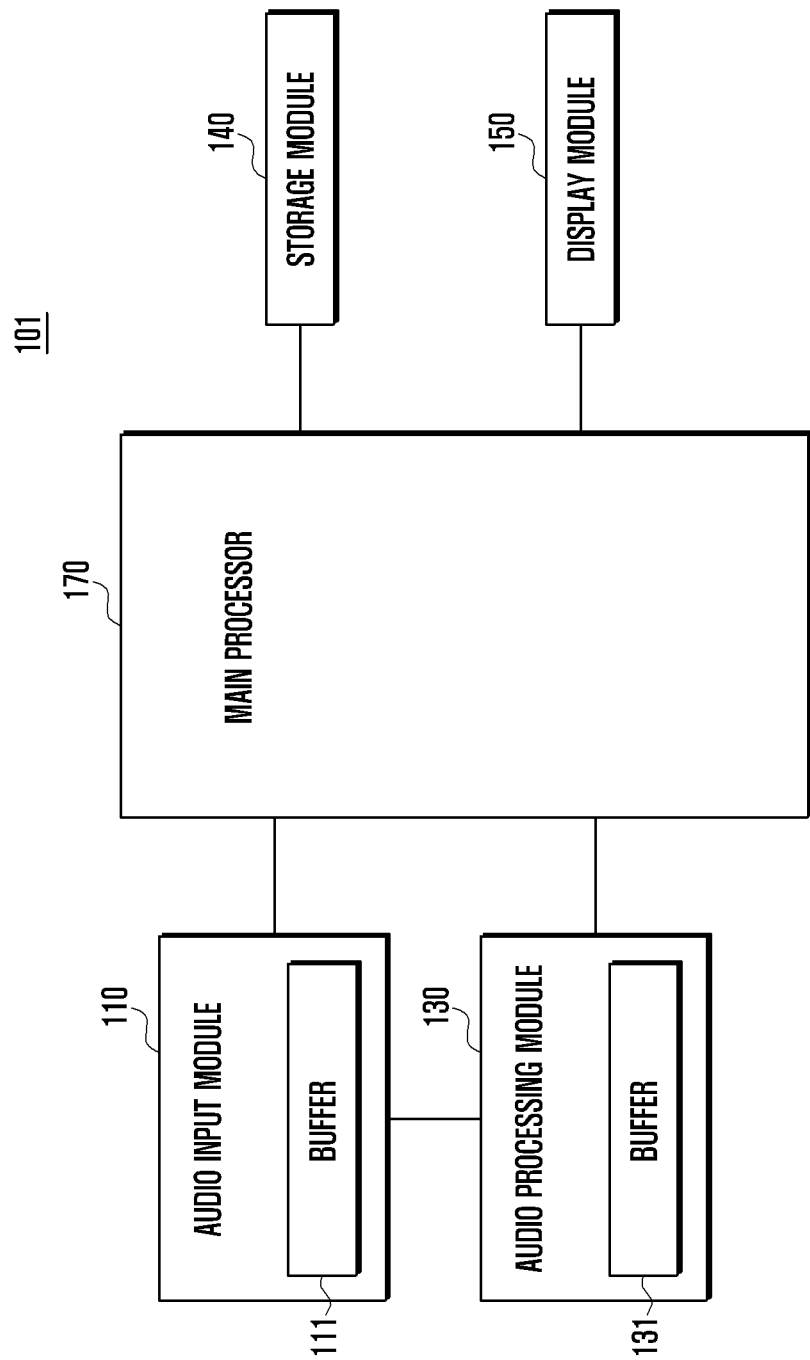
FIG. 1 is a block diagram of an electronic device according to an embodiment of the present disclosure.

FIG. 1 is a block diagram of an electronic device according to an embodiment of the present disclosure.

Referring to FIG. 1, an electronic device 101 according to various embodiments includes an audio input module 110, an audio processing module 130, a storage module 140, a display module 150, and a main processor 170.

The audio input module 110 receives sound information as an audio signal. For example, the audio input module 110 may be a microphone (MIC).

The audio input module 110 remains in an on state regardless of a sleep mode or an operational mode of the main processor 170. The audio input module 110 stores an audio signal in a buffer 111 of the audio input module 110 at every predetermined time interval. The sound information received by the audio input module 110 may include noise, e.g., sounds from the environment around the electronic device, as well as a voice and a specific sound that is to be input.

The audio input module 110 may be implemented in the form of an Application Specific Integrated Circuit (ASIC) to support a sound recognition function. For example, the audio input module 110 may determine whether an audio signal generated by an input sound is a sound which requires driving of the voice recognition system and, when the audio signal is the sound which requires the driving of the voice recognition system, wake up the audio processing module 130. For example, when a size, e.g., dB level or the like, of the audio signal is greater than or equal to a preset threshold, the audio input module 110 recognizes the audio signal as being a sound which requires the driving of the voice recognition system. A reference of the determination on whether the sound requires the driving of the voice recognition system may be the size of the audio signal, a frequency band, and the like, and may be set according to a designer's intention. The audio input module 110 may transfer a driving signal, e.g., a wake up signal, a recognition request signal, an interrupt signal, or the like, to the audio processing module 130 (or the voice recognition module), and transfer the audio signal stored in the buffer 111 to a buffer 131 of the audio processing module 130.

The audio processing module 130 may be connected to the audio input module 110, to process an audio signal transmitted to/received from the audio input module 110 and the main processor 170 and perform a function of processing audio signals. For example, the audio processing module 130 may perform a function of converting an analog signal into a digital signal, or a digital signal into an analog signal, an audio input/out pre/post-processing function, and a voice recognition function.

The audio processing module 130 may include a Digital Signal Processor (DSP). The audio processing module 130 may operate independently from or dependently with the main processor, and operate in the sleep mode or the operational mode. The audio processing module 130 may control an operation clock of the audio processing module 130 according to a function of processing the audio signal, e.g., reproducing a sound, converting a signal, or the like. The audio processing module 130 processes the audio signal and stores the audio signal in the buffer 131 at a predetermined time interval.

When a driving signal is transferred from the audio input module 110 in the sleep mode, the audio processing module 130 may switch the sleep mode to the operational mode. The audio processing module 130 may be activated in response to the driving signal to analyze the audio signal transferred from the audio input module 110 and perform voice recognition on the audio signal. The audio processing module 130 may recognize the voice trigger input by a speaker (or a registered speaker) by performing at least one of the keyword recognition and the speaker recognition. When the voice recognition is successful, the audio processing module 130 buffers, in the buffer 131, the audio signal input from the audio input module 110 continuously for a time during which the main processor 170 is activated, and transfers the buffered audio signal and/or voice signal at the time point at which the main processor 170 is activated. In contrast, the audio processing module 130 may switch the operational mode to the sleep mode when the voice recognition fails.

For example, the audio processing module 130 may perform the keyword recognition and the speaker recognition in parallel or sequentially. When both the keyword recognition and the speaker recognition are successful, the audio processing module 130 transfers the driving signal to the main processor 170. When one of the keyword recognition and the speaker recognition fails, the audio processing module 130 switches to the sleep mode.

In another example, the audio processing module 130 performs one of the keyword recognition and the speaker recognition, and activates the main processor 170 when the recognition is successful or when switching to the sleep mode when the recognition fails.

When the voice recognition (for example, at least one of the keyword recognition and the speaker recognition) is successful, the audio processing module 130 continuously transfers the audio signal input from the audio input module to the main processor and, when receiving a recognition failure result from the main processor 170, switches the operational mode to the sleep mode. The storage module 140 stores commands or data received from the main processor or other elements (for example, the audio processing module and the like) or generated by other elements. For example, the storage module 140 stores an Operating System (OS) for booting the electronic device 101 and operating the aforementioned elements, at least one application program, data according to function execution, and the like.

The storage module 140 may include programming modules, for example, a kernel, middleware, an Application Programming Interface (API), applications, or the like. Each of the aforementioned programming modules may be formed of software, firmware, hardware, or a combination of at least two thereof. The storage module 140 may store at least one voice recognition algorithm for the voice recognition function and modeling information on the registered speaker.

The display module 150 performs a function of displaying an image or data to a user. The display module 150 may include a display panel. The display panel may employ, for example, a Liquid Crystal Display (LCD) or an Active Matrix Organic Light Emitting Diode (AM-OLED). The display module 150 may further include a controller that controls the display panel. The display panel may be implemented to be, for example, flexible, transparent, and/or wearable. Meanwhile, the display module 150 may be configured as a module (for example, a touch screen type) coupled with the touch panel. The display module 150 may display various screens according to application/function execution by the electronic device 101, for example, a call application/function execution screen, a camera execution application screen, a voice recognition function execution screen, and the like.

The main processor 170 receives commands from the elements (for example, the audio processing module 130 and the like) of the electronic device 101, analyzes the received commands, and performs calculations and data processing according to the analyzed commands. For example, when power is supplied, the main processor 170 controls a booting process of the electronic device 101 and executes various application programs stored in a program area to execute a function according to a user's setting. The main processor may include one or more Application Processors (APs) or one or more Communication Processors (CPs).

The main processor 170 can operate in the sleep mode or in the operational mode. When a driving signal for voice recognition is transferred from the audio processing module 130, the main processor 170 switches the sleep mode to the operational mode and performs voice recognition, e.g., at least one of the keyword recognition, the command recognition, and the speaker recognition. When the main processor 170 includes a plurality of calculation devices, the main processor 170 may activate one calculation device for the voice recognition function to perform the voice recognition in response to the driving signal of the audio processing module 130.

The main processor 170 analyzes the audio signal and/or voice signal and performs the keyword recognition, the speaker recognition, and the command recognition in parallel or sequentially.

When the audio processing module 130 performs one of the keyword recognition and the speaker recognition, the main processor 170 performs the other voice recognition, i.e., the voice recognition which has not been performed by the audio processing module 130. Further, the processor 170 may perform the command recognition.

When at least one of the keyword recognition and the speaker recognition fails, the main processor 170 transfers a recognition failure result to the audio processing module 130 and switches the operational mode to the sleep mode.

The main processor 170 divisibly recognizes the voice trigger and the voice command and, when the voice recognition is successful, performs the function of the electronic device according to the recognized voice command. For example, when the user registered in the electronic device inputs a voice of "Hi Galaxy, camera execution" in the sleep mode, the electronic device sequentially processes the voice input through the audio input module 110, the audio processing module 130, and the main processor 170, and the main processor 170 recognizes the voice input of "Hi Galaxy, camera execution" for operation of the electronic device, e.g., to turn off the screen, and perform a camera function. Here, "Hi Galaxy" corresponds to the voice trigger for activating the function based on the voice, and "camera execution" corresponds to the voice command for performing the corresponding function in response to the voice input. More specifically, the voice recognition may be divided into the voice trigger for automatically executing a voice recognition application and the voice command input after the voice trigger is recognized. For example, when the recognition of "Hi Galaxy" corresponding to the voice trigger from the audio signal is successful, the audio processing module 130 transfers the driving signal to the main processor. When the recognition of "Hi Galaxy" corresponding to the voice trigger is successful, and if the recognition of "camera execution" corresponding to the voice command is successful, the main processor operates the electronic device and performs the camera function.

The voice recognition by the main processor 170 may be implemented by a voice recognition system, which is more complex than a simple voice recognition system implemented in the audio processing module 130. The complex voice recognition system may use relatively more resources, e.g., a memory, a calculation amount, and similarity measurement, for determining the voice recognition and have a higher recognition rate in comparison with the simple voice recognition system.

For example, the keyword recognition performed by the main processor 170 may be implemented by a recognition algorithm of extracting only a single word that is to be recognized, based on Viterbi decoding, and the main processor 170 may have a relatively smaller misrecognition rate of the keyword recognition compared to the audio processing module 130. The speaker recognition by the main processor 170 may be implemented by a combination of one or more of, for example, a deep neural network-based recognition algorithm, a multi-neural network-based recognition algorithm, and a Universal Background Model-Gaussian Mixture Model (UBM-GMM)-based recognition algorithm. The multi-neural network-based recognition algorithm may determine authentication success/failure in consideration of multiple factors such as a keyword recognition result, a Signal to Noise Ratio (SNR), and background noise removal through a neural network in which a hidden layer exists. The UBM-GMM algorithm may determine authentication success/failure by comparing a UBM value and a speaker model value in the unit of frames through a binary determination method of comparing a GMM-based background model score and a speaker model score.

The main processor 170 may control the display module 150 while the voice recognition is performed.

For example, the main processor 170 maintains an off state of the display module 150 while the voice recognition is performed in the operational mode. The main processor 170 then either turns on the display module to display a function execution screen of the electronic device corresponding to the voice command if the voice recognition by the main processor is successful or maintains the off state of the display module if the voice recognition fails.

In another example, the main processor 170 controls output of a screen for informing of a voice recognition state while the voice recognition is performed in the operational mode. The main processor 170 displays the function execution screen of the electronic device in response to voice recognition success or turns off the display module when the voice recognition fails.

Figure 2:
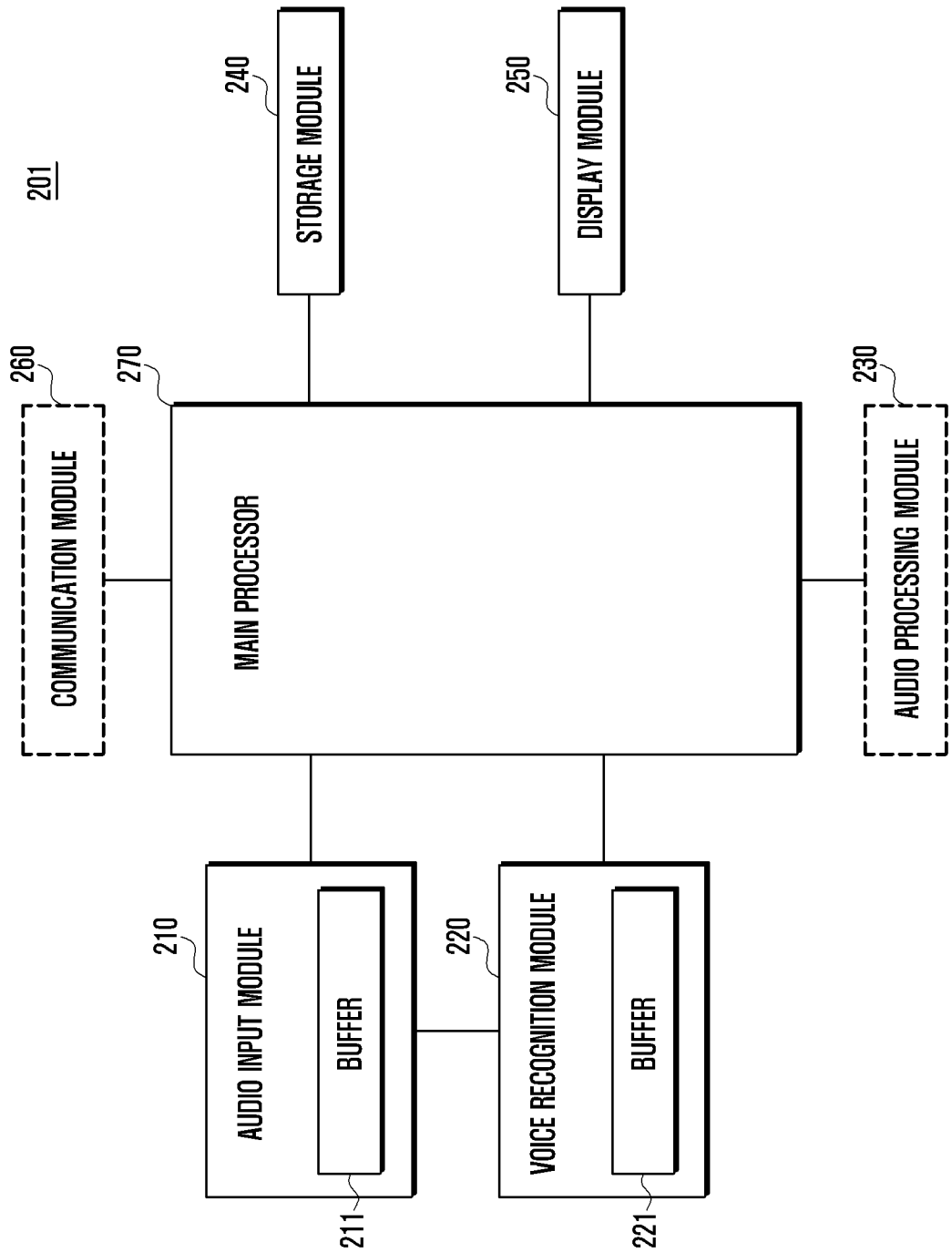
FIG. 2 is a block diagram of an electronic device according to an embodiment of the present disclosure.

FIG. 2 is a block diagram of an electronic device according to an embodiment of the present disclosure.

Referring to FIG. 2, an electronic device 201 according to various embodiments includes an audio input module 210, a voice recognition module 220, an audio processing module 230, a storage module 240, a communication module 260, a display module 250, and a main processor 270.

The audio input module 210 continually operates, i.e., does not change operation state, regardless of a sleep mode or an operational mode of the main processor 270. The audio input module 210 may be implemented in the ASIC type like the audio input module 110 described in FIG. 1 to support a sound recognition function.

In the embodiment of FIG. 2, the audio input module 210 determines whether an audio signal stored in a buffer 211 is a sound which requires driving of the voice recognition system and, when the audio signal is the sound which requires the driving of the voice recognition system, wakes up the voice recognition module 220. When the input audio signal is determined to be a sound which requires driving of the voice recognition system, the audio input module 210 transfers a driving signal (for example, a wake up signal, a voice recognition request signal, an interrupt signal, or the like) to the voice recognition module 220 and transfers the audio signal stored in the buffer 211 to the buffer 221 of the voice recognition module 220. The voice recognition module 220 is connected to the audio input module 210 and the main processor 270 and supports a voice recognition (for example, at least one of keyword recognition and speaker recognition) function. The voice recognition module 220 may include a low power processor which operates only for the voice recognition function. The voice recognition module 220 may operate independently from or dependently on the main processor 270, and may independently operate in the sleep mode or the operational mode. For example, the voice recognition module 220 may maintain the sleep mode, regardless of the operation state of the main processor 270. When the driving signal is received from the audio input module 210, the voice recognition module 220 transfers to the operational mode to perform voice recognition based on the audio signal transferred from the audio input module 210. When the voice recognition is successful, the voice recognition module 220 drives the main processor 270 and transfers the audio signal stored in the buffer 221 to the main processor 270. The voice recognition module 220 drives the main processor when the voice trigger recognition is successful.

The voice recognition module 220 may switch to the sleep mode when the voice recognition (for example, at least one of the keyword recognition and the speaker recognition) fails, or may switch the operational mode to the sleep mode when receiving voice recognition failure information from the main processor 270.

The voice recognition module 220 may be included in the audio processing module 130 of FIG. 1.

Meanwhile, in the embodiment of FIG. 2, the electronic device 201 further includes the audio processing module 230, which processes audio data such as audio signal pre/post-processing, a signal conversion function, a noise removal function, and the like without involvement in the voice recognition function, unlike the embodiment of FIG. 1.

The storage module 240 and the display module 250 are similar to the storage module 140 and the display module 150 described in FIG. 1, and detailed descriptions thereof are omitted to avoid redundancy.

The main processor 270 according to the embodiment of FIG. 2 performs similar operation as the basic operation of the main processor 170 described in FIG. 1, and overlapping description thereof is omitted.

Unlike the embodiment of FIG. 1, the main processor 270 of FIG. 2 receives the driving signal from the voice recognition module 220, to switch the sleep mode to the operational mode in response to the driving signal from the voice recognition module 220, and perform voice recognition. The main processor 270 may be implemented by the same voice recognition system as the voice recognition implemented in the main processor of FIG. 1. When the voice recognition is successful, the main processor 270 performs the function of the electronic device according to a command corresponding to the voice input. When the voice recognition fails, the main processor 270 transfers a recognition failure result to the voice recognition module 220 and switches the operational mode to the sleep mode.

The electronic device 201 in the embodiment of FIG. 2 further includes the communication module 260.

The communication module 260, an example of which includes a transceiver, to communicate with a network through wired/wireless communication to perform voice, video, or data communication with an external device, e.g., a server, with the communication module 260 being controlled by the main processor 270. The wireless communication may include at least one of, for example, Wi-Fi, Bluetooth (BT), Near Field Communication (NFC), a Global Positioning System (GPS), and cellular communication, e.g., Long Term Evolution (LTE), Long Term Evolution-Advanced (LTE-A), Code Division Multiple Access (CDMA), Wideband CDMA (WCDMA), Universal Mobile Telecommunication System (UMTS), Wireless Broadband (WiBro), or Global System for Mobile communication (GSM). The wired communication may include at least one of, e.g., a Universal Serial Bus (USB), a High Definition Multimedia Interface (HDMI), Recommended Standard 232 (RS-232), and a Plain Old Telephone Service (POTS).

The communication module 260 communicates with the server to additionally support the voice recognition function. For example, when the voice recognition module 220 primarily succeeds in the voice recognition and the main processor 270 secondarily succeeds in the voice recognition, the audio signal and/or voice signal may be transmitted to a voice recognition server, which uses additional resources than the electronic device, through the communication module 260.

According to another embodiment, the main processor distinguishes between the voice trigger and the voice command, which is input after the voice trigger is recognized, and transfers the distinguished voice to the server. The main processor transfers a voice signal corresponding to the voice command input after the voice trigger is recognized or transfer information identifying a time point at which the voice trigger and the voice command are separated. Then, when the audio signal or the voice signal, which has not been distinguished, is transferred from the main processor 270, the server may distinguish the voice trigger and the voice command and perform the voice recognition.

The server may perform the voice recognition on the audio signal (or/and voice signal) transferred from the electronic device 201 to recognize a voice command and provide a recognition result of the voice command to the electronic device. When the voice recognition is successful, the server may convert the voice command into text and transfer information on the converted text to the electronic device 201. When the voice recognition fails, the server may provide failure information to the electronic device 201.

While the main processor 270 of the electronic device 201 may recognize limited voice commands, the server may recognize additional voice commands, as compared to the main processor 270. For example, the main processor 270 may recognize a voice command, which is simple or pre-configured in the electronic device such as "camera execution" or "phone call execution", and perform the function of the electronic device 201 based on the recognized voice command. In contrast, the electronic device 201 may request that the server recognize complex or various voice commands, receive a voice recognition result from the server, and perform a function corresponding to the voice recognition.

The communication module 260 may receive, from the server, information on the result of the voice recognition performed by the server. When the voice recognition is successful and text information is received from the server, the main processor 270 performs a function corresponding to the received text information. When voice recognition failure information is received from the server, the main processor 270 switches the operational mode to the sleep mode.

Figure 3:
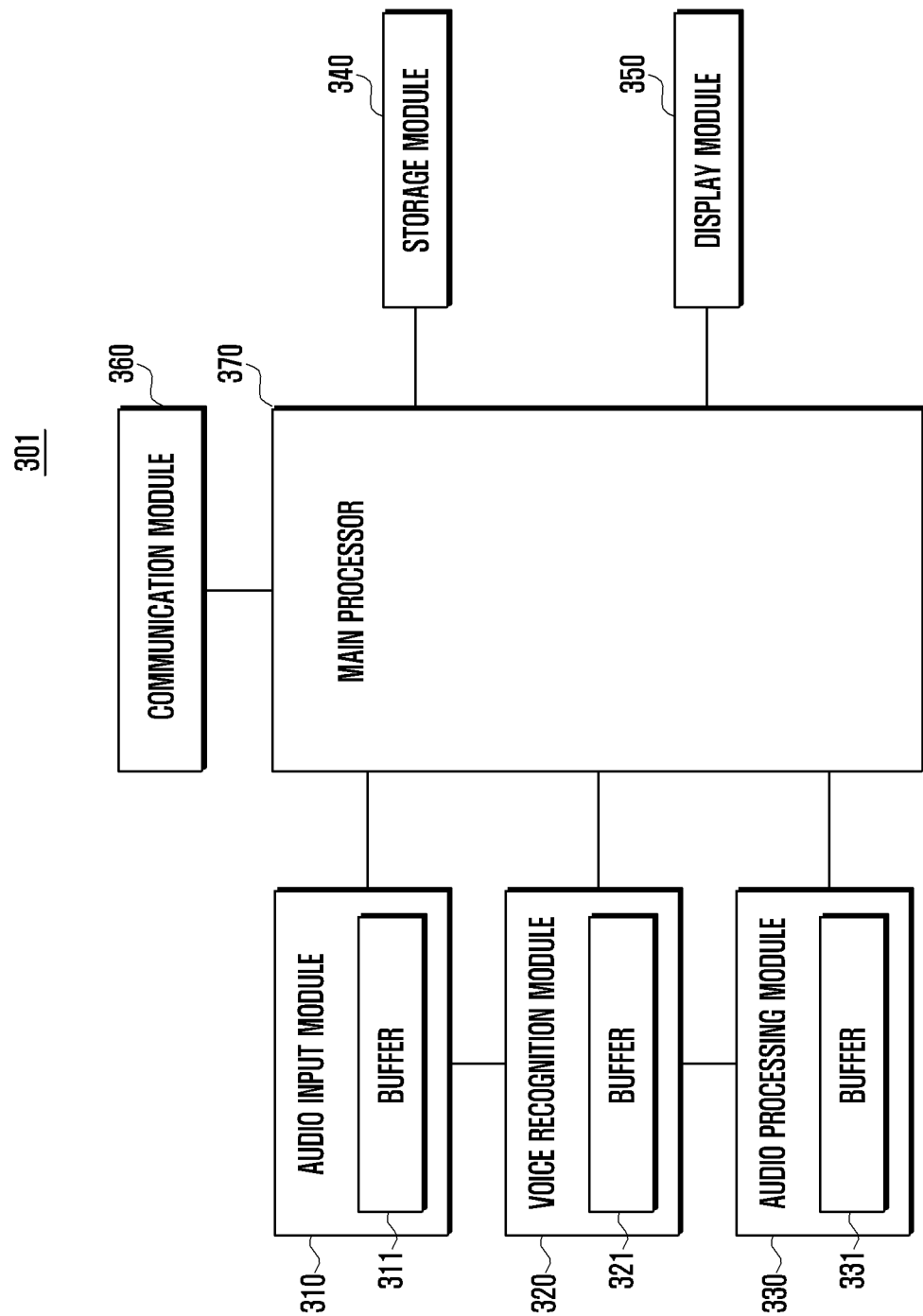
FIG. 3 is a block diagram of an electronic device according to an embodiment of the present disclosure.

FIG. 3 is a block diagram of an electronic device according to an embodiment of the present disclosure.

Referring to FIG. 3, an electronic device 301 includes an audio input module 310, a voice recognition module 320, an audio processing module 330, a storage module 340, a display module 350, a communication module 360, and a main processor 370.

Since the audio input module 310, the storage module 340, the display module 350, and the communication module 360 are the same as the audio input module 210, the storage module 240, the display module 250, and the communication module 260 of FIG. 2 described above, detailed descriptions thereof are omitted to avoid redundancy.

The voice recognition module 320 according to the embodiment of FIG. 3 receives an audio signal stored in a buffer 311 of the audio input module 310 and primarily perform voice recognition based on the audio signal. When the voice recognition is successful, the voice recognition module 320 wakes up the audio processing module 330 and transfers an audio signal stored in a buffer 321 of the voice recognition module 320 to the audio processing module 330.

The audio processing module 330 switches the sleep mode to the operational mode based on an activation signal of the voice recognition module 320, receives the audio signal stored in the buffer 321 of the voice recognition module 320, and secondarily performs the voice recognition based on the audio signal. When the voice recognition is successful, the audio processing module 330 activates the main processor 370 by transferring a driving signal and transferring an audio signal stored in a buffer 331 to the main processor 370.

Since the main processor 370 according to the embodiment of FIG. 3 performs the same operation as the voice recognition operation of the main processor 270 described in FIG. 2, an overlapping description thereof is omitted to avoid redundancy.

The main processor 370 receives a driving signal from the audio processing module 330, switches the sleep mode to the operational mode based on the driving signal, and tertiarily performs the voice recognition on the audio signal transferred from the audio processing module 330.

The voice recognition module 320 and the audio processing module 330 perform at least one of the keyword recognition and the speaker recognition, and the main processor 370 performs at least one of the keyword recognition, the speaker recognition, and the command recognition. When the voice recognition is successful, the main processor 370 performs the function of the electronic device according to a command corresponding to the voice input. If the voice recognition fails, the main processor 370 transfers a recognition failure result to the voice recognition module 320 and the audio processing module 330, and switches the operational mode to the sleep mode.

If the voice recognition is successful, the main processor 370 transmits the audio signal and/or the voice signal to the server, which supports the voice recognition, through the communication module 360, and receives recognition result information on the voice recognition from the server. Since the operation of the server is the same as that of the server described in FIG. 2, a detailed description thereof is omitted to avoid redundancy.

If the voice recognition is successful and text information is received from the server, the main processor 370 performs the function corresponding to the received text information. If voice recognition failure information is received, the main processor 370 switches the operational mode to the sleep mode.

Hereinafter, a method of operating the voice recognition function for the various components of the electronic device is described.

Figure 4:
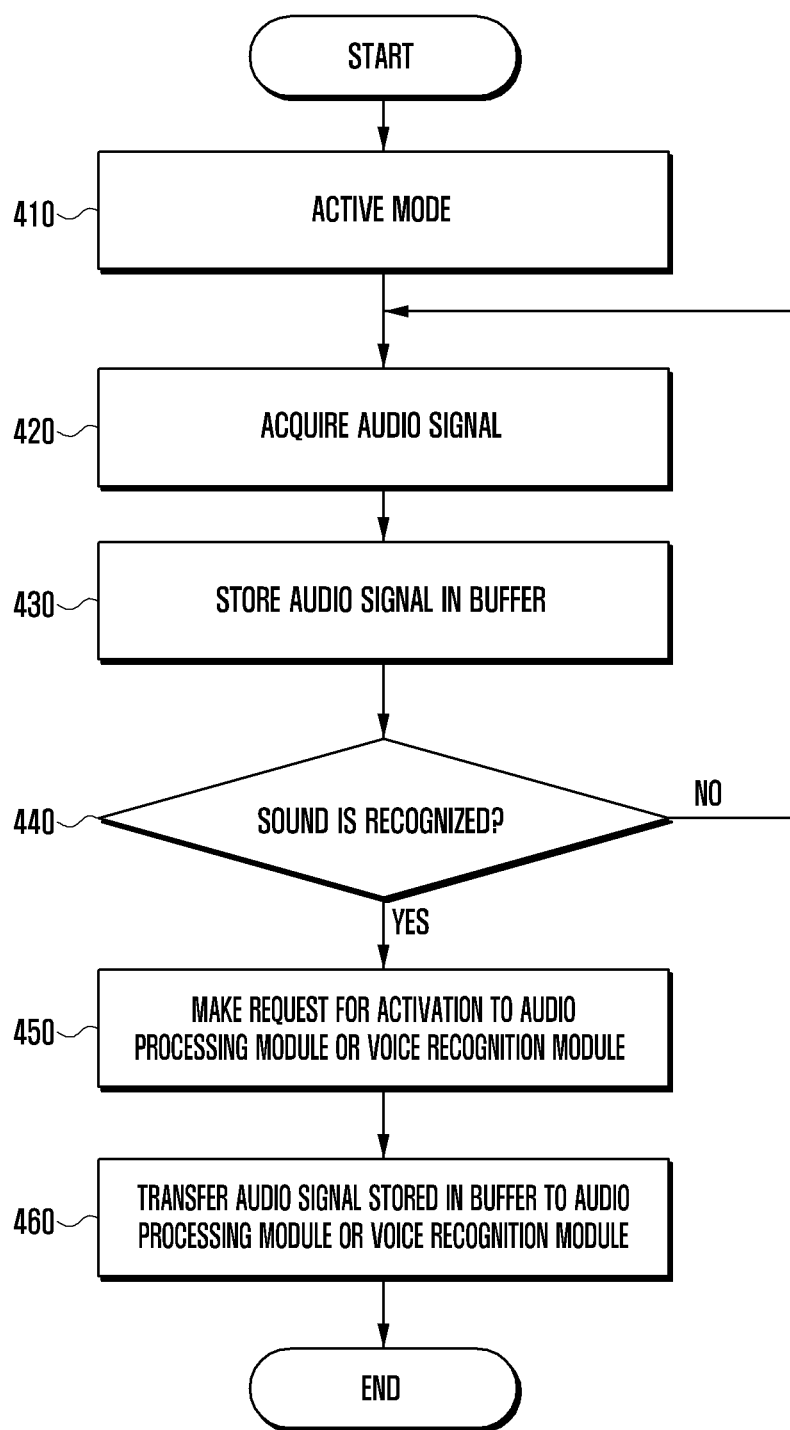
FIG. 4 is a flowchart illustrating a method for voice recognition of an audio input module in the electronic device according to an embodiment of the present disclosure.

FIG. 4 is a flowchart illustrating a method for voice recognition of the audio input module in the electronic device according to an embodiment of the present disclosure.

Referring to FIG. 4, the audio input module of the electronic device operates in the operational mode in Step 410. For example, the audio input module continues to operate regardless of the operational state or the sleep (or standby) state of the electronic device, e.g., the main processor operates in the sleep mode and the display module is in an off state, and acquires an audio signal generated by a sound.

The audio input module acquires the audio signal generated by the sound in Step 420, and stores the audio signal in the buffer in Step 430. The buffer included within the audio input module may be implemented as a circular buffer, and audio signals may be transferred to the audio processing module (or the audio recognition module) in an order that the audio signals are stored in the circular buffer.

In Step 440, the audio input module determines whether the audio signal is a sound which requires driving of the voice recognition system. For example, when the size of the audio signal in the buffer generated by the sound is an audio signal greater than or equal to a preset threshold or an audio signal in a particular frequency band, the audio input module recognizes the audio signal as the sound which requires driving of the voice recognition system.

If the audio signal is recognized as the sound which requires driving of the voice recognition system, the audio input module transfers a driving signal for an activation request to the audio processing module or the voice recognition module in Step 450. In Step 460, the audio input module transfers the audio signal stored in the buffer to the activated audio processing module (or voice recognition module).

For example, the audio input module first transfers the audio signal to the buffer within the audio processing module or the voice recognition module for a time during which the audio processing module or the voice recognition module is activated, and then sequentially transfers audio signals acquired in real time to the audio processing module or the voice recognition module.

Meanwhile, if the audio signal is not recognized as the sound which requires driving of the voice recognition system in Step 440, the audio input module returns to Step 420 and repeats the operation of acquiring the audio signal. As described above, the audio input module may maintain the operational state to constantly recognize the sound and, if the sound is recognized, activates the audio processing module or the voice recognition module to process the audio signal and transmits the audio signal.

Figure 5:
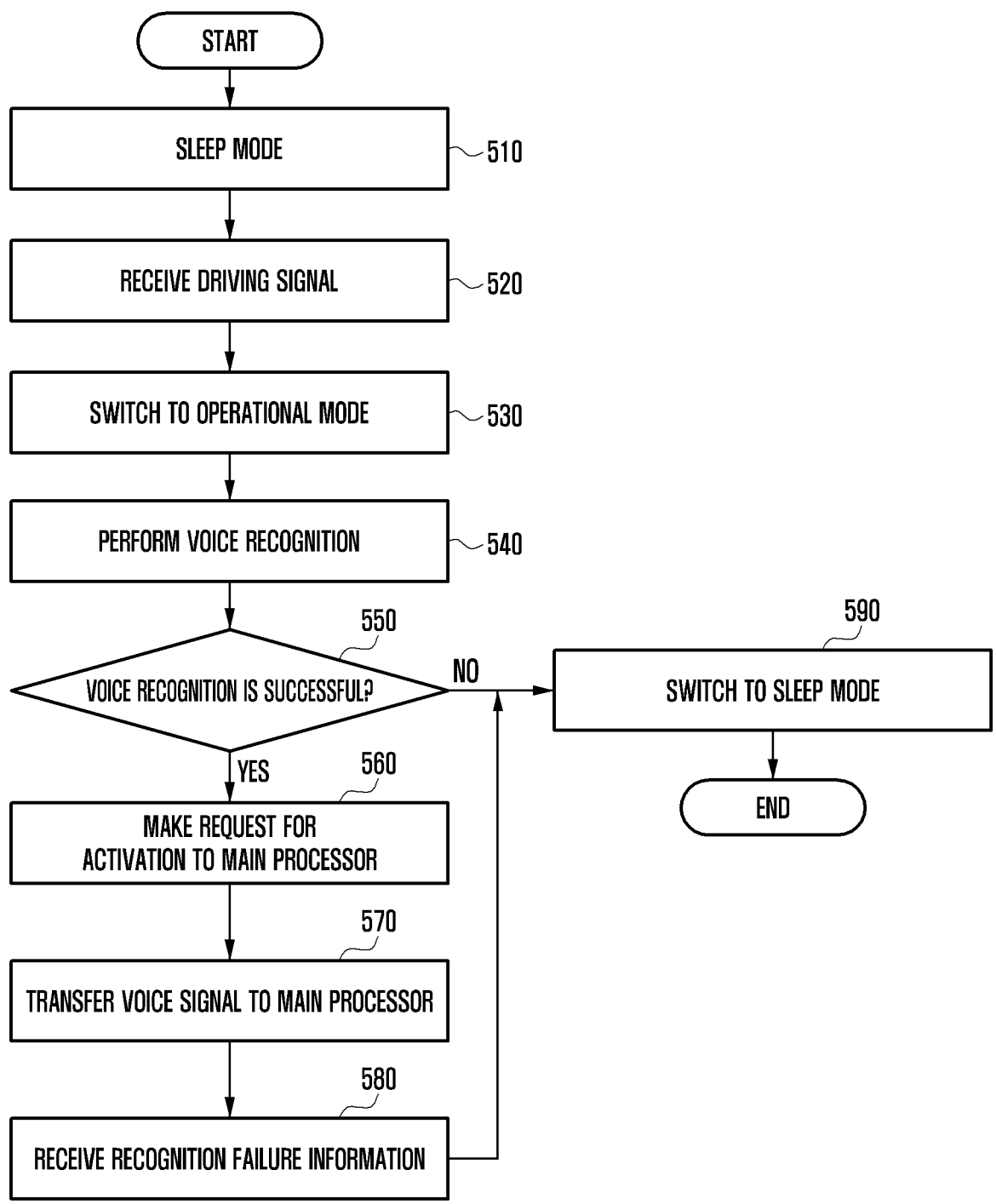
FIG. 5 is a flowchart illustrating a method for voice recognition of an audio processing module in the electronic device according to an embodiment of the present disclosure.

FIG. 5 is a flowchart illustrating a method for voice recognition of the audio processing module in the electronic device according to an embodiment of the present disclosure.

Referring to FIG. 5, in Step 510, the audio processing module of the electronic device initially operates in the sleep mode. For example, the audio processing module operates in the sleep mode when the electronic device is in a sleep (or standby) state, e.g., the main processor operates in the sleep mode and the display module is in an off state.

In Step 520, the audio processing module receives a driving signal from the audio input module. When the driving signal is received, the audio processing module switches the sleep mode to the operational mode in Step 530. In Step 540, the audio processing module performs voice recognition on an audio signal input from the audio input module. The voice recognition may include keyword recognition and speaker recognition. The audio processing module recognizes a keyword corresponding to a voice trigger in the audio signal.

The keyword recognition by the audio processing module may be performed using a recognition algorithm that extracts only a word to be recognized, based on Viterbi decoding, and the speaker recognition may be performed using a simple neural network-based recognition algorithm.

The audio processing module determines whether the voice recognition is successful in Step 550, and transfers the driving signal to request activation of the main processor in Step 560.

The audio processing module performs the keyword recognition and the speaker recognition in parallel or sequentially based on the audio signal transferred from the audio input module, or performs one of the keyword recognition and the speaker recognition. For example, the audio processing module recognizes a voice trigger for automatically driving the voice recognition system or application.

In Step 570, the audio processing module transfers the audio signal, e.g., voice signal, to the main processor. The audio processing module performs voice recognition on the audio signal transferred from the audio input module in real time and, when the voice recognition is successful, buffers the audio signal during the time that the main processor is activated. When the main processor is activated, the audio processing module transfers the audio signal to the main processor in real time.

Meanwhile, if in Step 550 it is determined that the voice recognition fails, the audio processing module switches the operational mode to the sleep mode in Step 590.

In the operational mode, the audio processing module receives failure information according to voice recognition failure of the main processor from the main processor in Step 580. When the voice recognition failure information is received from the main processor, the audio processing module switches the operational mode to the sleep mode in Step 590.

Figure 6:
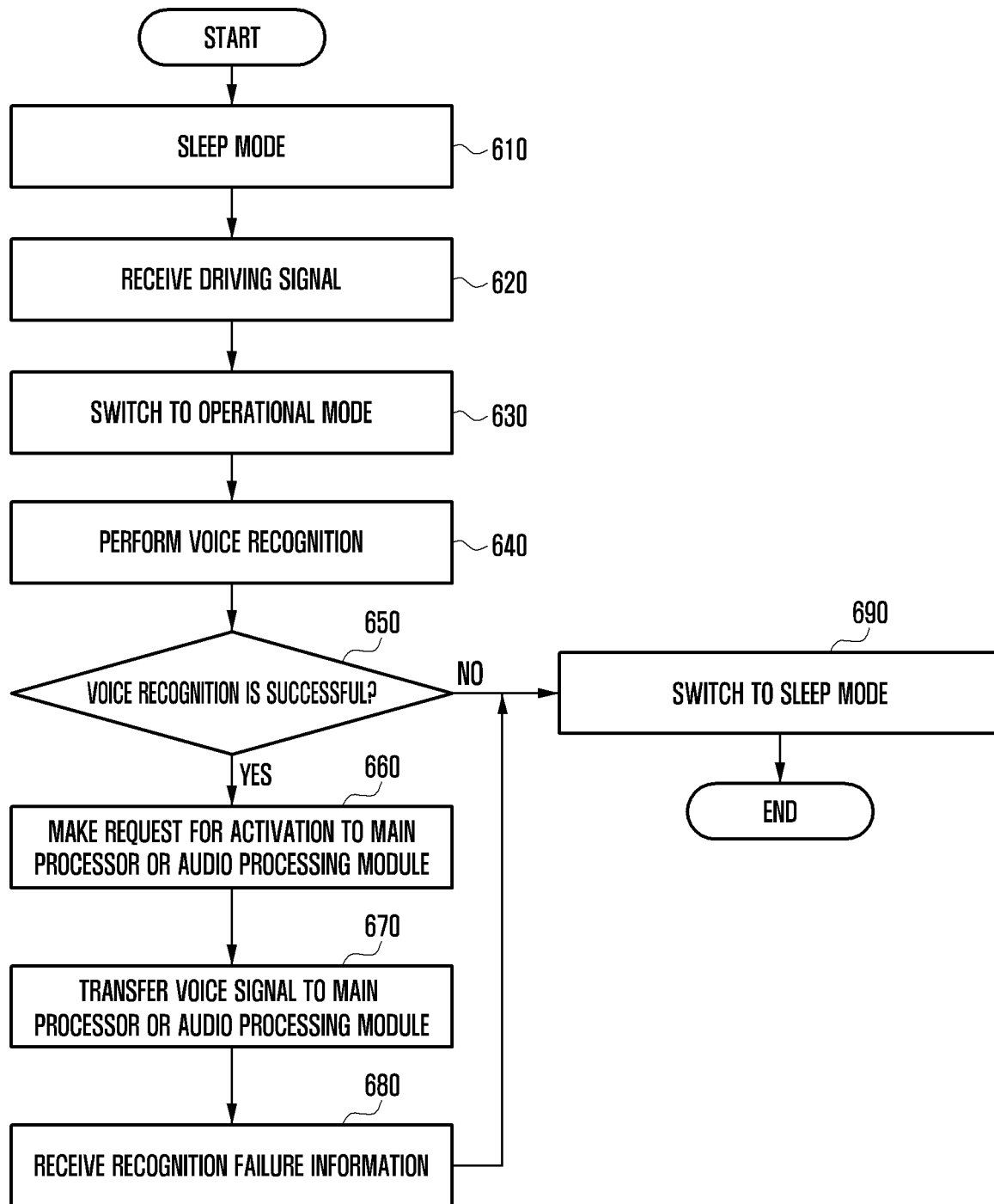
FIG. 6 is a flowchart illustrating a method for voice recognition of a voice recognition module in the electronic device according to an embodiment of the present disclosure.

FIG. 6 is a flowchart illustrating a method for voice recognition of the voice recognition module in the electronic device according to an embodiment of the present disclosure.

Referring to FIG. 6, the electronic device includes a voice recognition module, and the voice recognition module initially operates in the sleep mode in Step 610. The voice recognition module implements a low power chip to reduce current consumption and may restrictively operate, i.e., operate only for the voice recognition function. The voice recognition module may be included in the audio processing module or implemented in the electronic device as an element that is separate from the audio processing module.

In Step 620, the audio recognition module receives a driving signal from the audio input module. When the driving signal is received, the voice recognition module switches the sleep mode to the operational mode in Step 630. In Step 640, the voice recognition module performs voice recognition on an audio signal transferred from the audio input module.

The voice recognition may include at least one of keyword recognition and speaker recognition. Further, the voice recognition module may recognize a voice trigger for automatically driving the voice recognition application. The voice recognition module determines whether the voice recognition is successful in Step 650 and, if the voice recognition is successful, transfers a driving signal to the main processor or the audio processing module to request activation in Step 660.

For example, when the audio processing module of the electronic device is not involved in the voice recognition function, the voice recognition module activates the main processor if the voice recognition is successful. When the voice recognition module and the audio processing module are separately implemented in the electronic device and the audio processing module is not involved in the voice recognition function, the voice recognition module activates the audio processing module.

In Step 670, the voice recognition module transfers the audio signal, e.g., voice signal, to the main processor or the audio processing module. Meanwhile, if in Step 650 it is determined that the voice recognition fails, the voice recognition module switches the operational mode to the sleep mode in Step 690.

When, in the operational mode, the voice recognition module receives failure information according to voice recognition failure from the main processor or the audio processing module in Step 680, the voice recognition module switches the operational mode to the sleep mode in Step 690.

Figure 7:
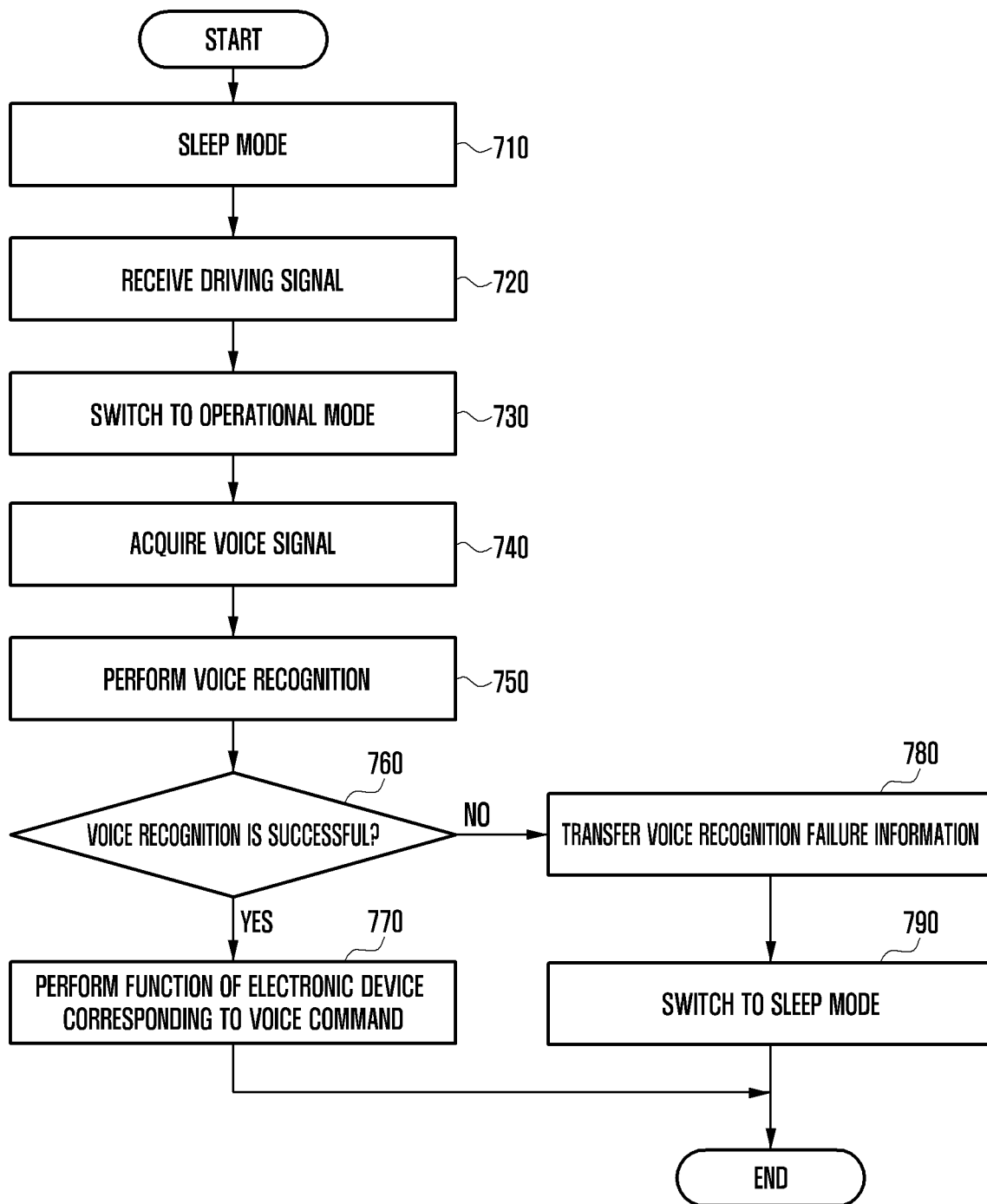
FIG. 7 is a flowchart illustrating a method for voice recognition of a main processor in the electronic device according to an embodiment of the present disclosure.

FIG. 7 is a flowchart illustrating a method for voice recognition of the main processor in the electronic device according to an embodiment of the present disclosure.

Referring to FIG. 7, the main processor of the electronic device operates in the sleep mode in Step 710. The sleep mode of the main processor refers to a state where the electronic device is not used, that is, an inactive state of the application processor. The main processor of the sleep mode blocks power supply to some function blocks connected to the main processor.

If the main processor operates in the sleep mode, the audio input module maintains the active state, and even when the portable terminal is not used, detects sound information, acquires an audio signal, and stores the audio signal in the buffer.

In Step 720, the main processor receives a driving signal making a request for activation. For example, the main processor receives the driving signal from the audio processing module or the voice recognition module in the sleep mode.

In Step 730, the main processor switches the sleep mode to the operational mode in response to the driving signal. The main processor acquires an audio signal (or/and a voice signal) from the audio processing module or the voice recognition module in Step 740, and performs voice recognition on the audio signal (or/and the voice signal) in Step 750. For example, the main processor performs the voice recognition based on the audio signal input from the audio processing module and the voice signal primarily recognized by the audio processing module or the voice recognition module.

The main processor is implemented by a complex voice recognition system, which uses relatively more sources compared to a simple voice recognition system implemented in the audio processing module or the voice recognition module. For example, the keyword recognition by the main processor is implemented by a recognition algorithm that extracts only a word that is to be recognized, based on Viterbi decoding. The speaker recognition by the main processor may be implemented by a combination of one or more of a deep neural network-based recognition algorithm, a multi-neural network-based recognition algorithm, and the UBM-GMM-based recognition algorithm.

The main processor performs the voice recognition by distinguishing between a voice trigger for automatically executing a voice recognition application and a voice command input after the voice trigger is recognized. Alternatively, the main processor performs the voice recognition on the audio signal transferred from the audio processing module or the voice recognition module in the active state.

The main processor determines whether the voice recognition is successful in Step 760. If the voice recognition is successful, the main processor identifies a command corresponding to the voice recognition and performs a function of the electronic device based on the voice command in Step 770.

If in Step 760 the voice recognition fails, in Step 780 the main processor transfers failure information which informs the audio processing module or the voice recognition module that the voice recognition fails and switches the operational mode to the sleep mode in Step 790.

The main processor controls a turn-on/turn-off operation of the display module while performing the voice recognition. An example of the turn-on/turn-off operation of the display module with respect to the voice recognition of the main processor is described in FIGS. 12A, 12B, 13A and 13B.

Figure 8:
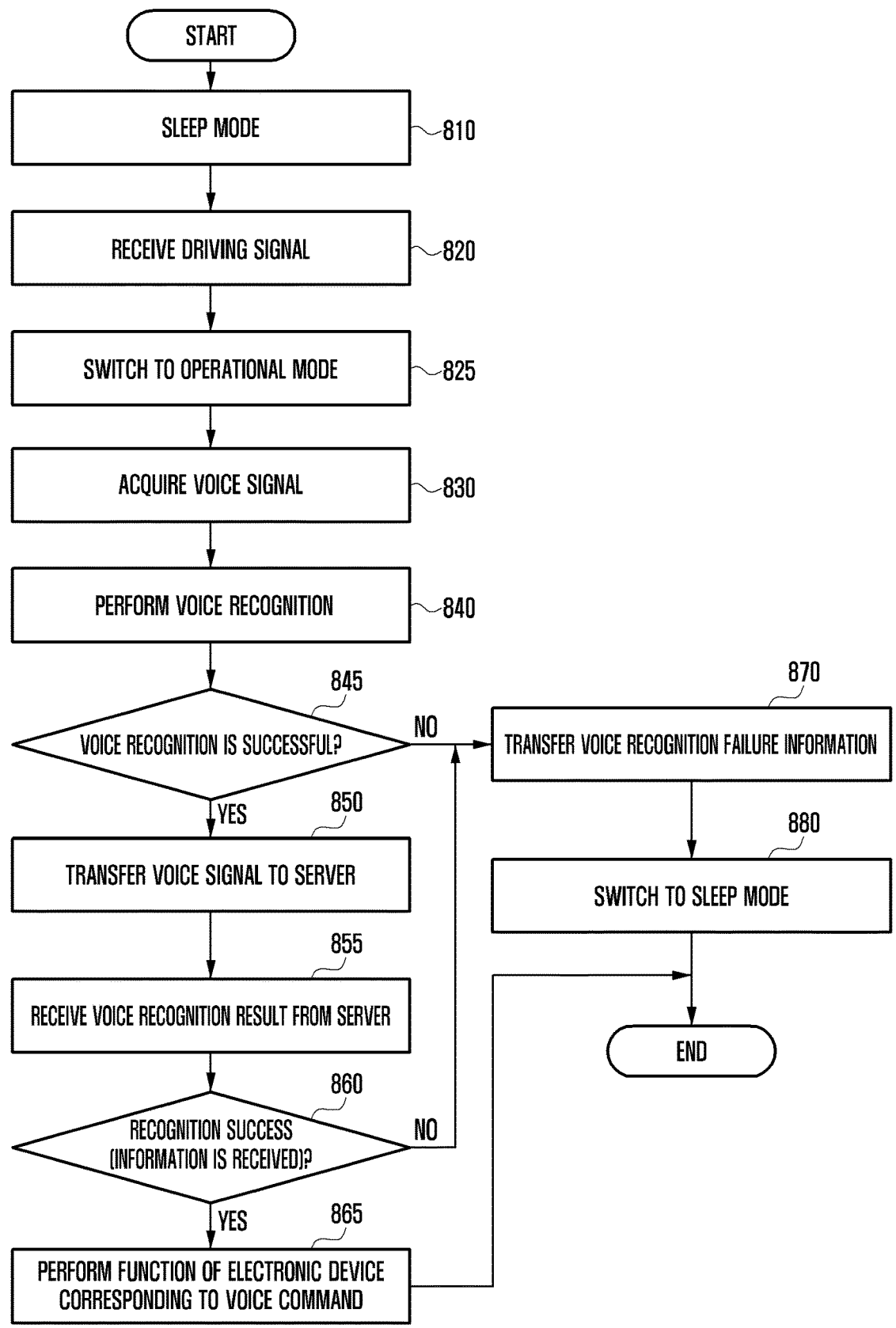
FIG. 8 is a flowchart illustrating a method for voice recognition of the main processor in the electronic device according to an embodiment of the present disclosure.

FIG. 8 is a flowchart illustrating a method for voice recognition of the main processor in the electronic device according to an embodiment of the present disclosure.

Referring to FIG. 8, the main processor of the electronic device operates in the sleep mode in Step 810. In Step 820, the main processor receives a driving signal making a request for activation. For example, in the sleep mode, the main processor receives a driving signal from the audio processing module or the voice recognition module.

In Step 825, the main processor switches the sleep mode to the operational mode in response to the driving signal. The main processor acquires an audio signal (or/and a voice signal) from the audio processing module or the voice recognition module in Step 830, and performs voice recognition on the audio signal in Step 840.

The main processor determines whether the voice recognition is successful in Step 845 and, when the voice recognition is successful, transmits a voice recognition request and the audio signal (and/or voice signal) to the server supporting the voice recognition through the communication module in Step 850. The main processor transfers, to the server, at least one of the audio signal input from the audio input module based on an external sound and the voice signal extracted based on the voice recognition. The main processor is implemented by a complex voice recognition system, which uses more resources, as compared to a simple voice recognition system implemented in the audio processing module or the voice recognition module. The main processor performs the voice recognition by distinguishing between a voice trigger for automatically executing a voice recognition application and a voice command input after the voice trigger is recognized. The main processor transfers a voice signal corresponding to the voice command that is input after the voice trigger is recognized or transfers information identifying a time point at which the voice trigger and the voice command are separated. Then, the server performs the voice recognition based on the audio signal (or/and voice signal) transferred from the electronic device. The voice recognition performed by the server may be at least one of the keyword recognition, the speaker recognition, and the command recognition. As indicated above, the server may recognize many more voice commands, as compared to the main processor. The server may perform the voice recognition through a Deep Neural Network (DNN)-based UBM-GMM algorithm and transmit result information on the voice recognition to the electronic device. For example, when the voice recognition is successful, the server may convert the recognized voice command into text information and transmit the text information to the electronic device. When the voice recognition fails, the server may transmit failure information which informs the electronic device that the voice recognition fails to the electronic device.

In Step 855, the main processor receives a voice recognition result from the server. When the main processor receives success information on the voice recognition based on the result of the voice recognition in Step 860, the main processor identifies a command corresponding to the voice recognition and performs a function of the electronic device based on the voice command in Step 865.

When the voice recognition fails, the main processor transfers failure information which informs the audio processing module or the voice recognition module that the voice recognition fails in Step 870 and switches the operational mode to the sleep mode in Step 880.

Figure 9:
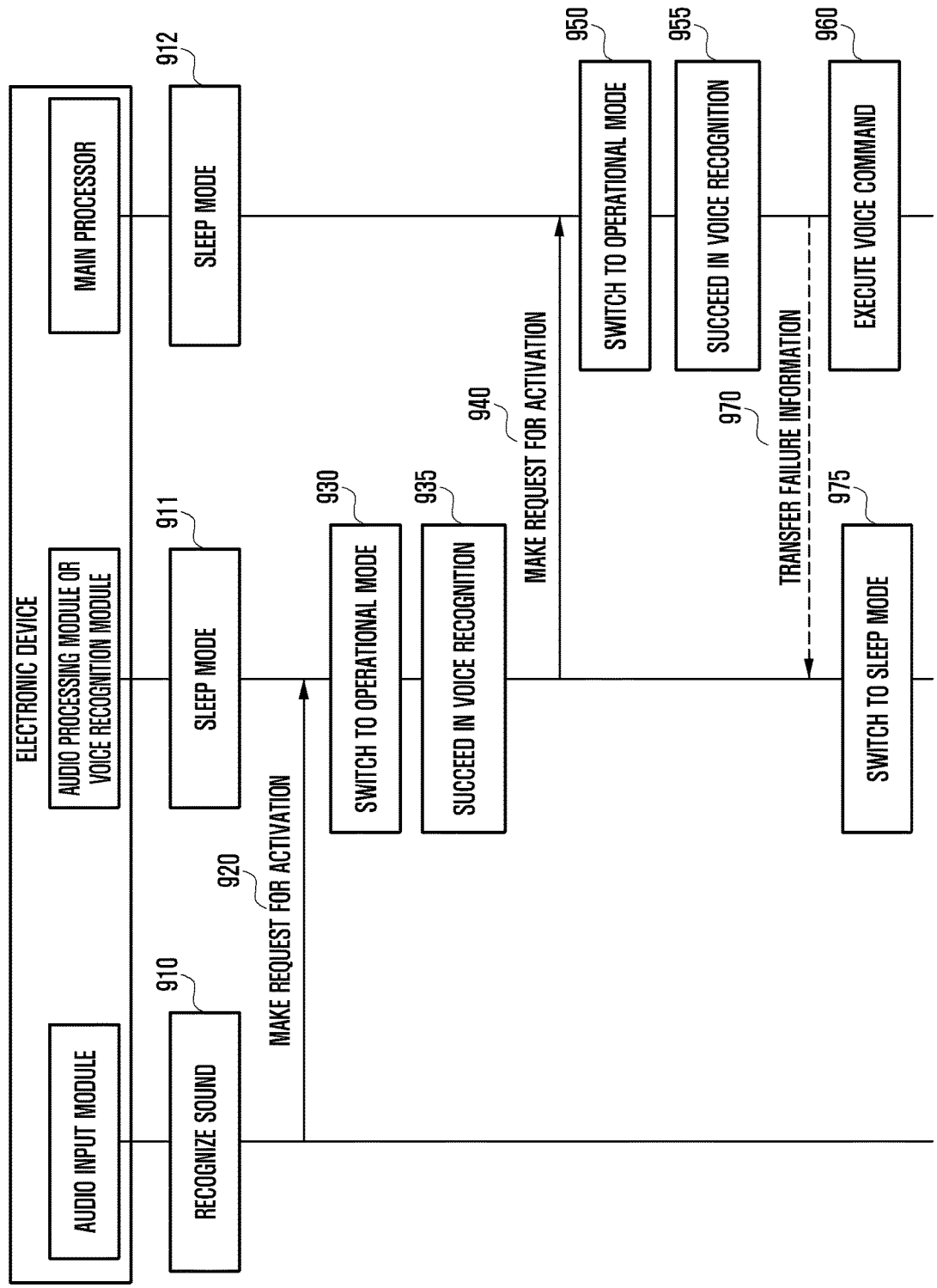
FIG. 9 is a flow diagram illustrating voice recognition between components of the electronic device according to an embodiment of the present disclosure.

FIG. 9 is a flowchart illustrating a method for voice recognition between components of the electronic device according to an embodiment of the present disclosure.

Referring to FIG. 9, the electronic device recognizes a sound by the audio input module in Step 910. When the audio input module recognizes the sound, the electronic device transfers a driving signal to the audio processing module to request activation in Step 920. The audio processing module operates in the sleep mode in Step 911 and, when the driving signal is received from the audio input module, is woken up and switches to the operational mode in Step 930. The electronic device may perform, by the audio processing module, voice recognition based on an audio signal (for example, voice signal) acquired from the audio input module in Step 935. When the audio processing module succeeds in the voice recognition, the audio processing module transfers a driving signal to the main processor to request activation in Step 940. Meanwhile, when the audio processing module fails in the voice recognition based on a result of the voice recognition, the electronic device switches the audio processing module to the sleep mode and maintains the main processor in the sleep mode.

The main processor operates in the sleep mode in Step 912 and, when the driving signal is received from the audio processing module, the main processor is woken up and switches to the operational mode in Step 950. The main processor secondarily performs the voice recognition on the extracted voice signal and the audio signal input from the audio input module based on the voice recognition, which has been primarily performed by the audio processing module in Step 955.

When the main processor succeeds in the voice recognition based on the result of the voice recognition, the electronic device performs a function thereof based on the recognized voice command in Step 960. Meanwhile, when the main processor fails in the voice recognition based on the result of the voice recognition, in Step 975 the electronic device transfers voice recognition failure information to the audio processing module and switches the audio processing module and the main processor to the sleep mode.

Figure 10:
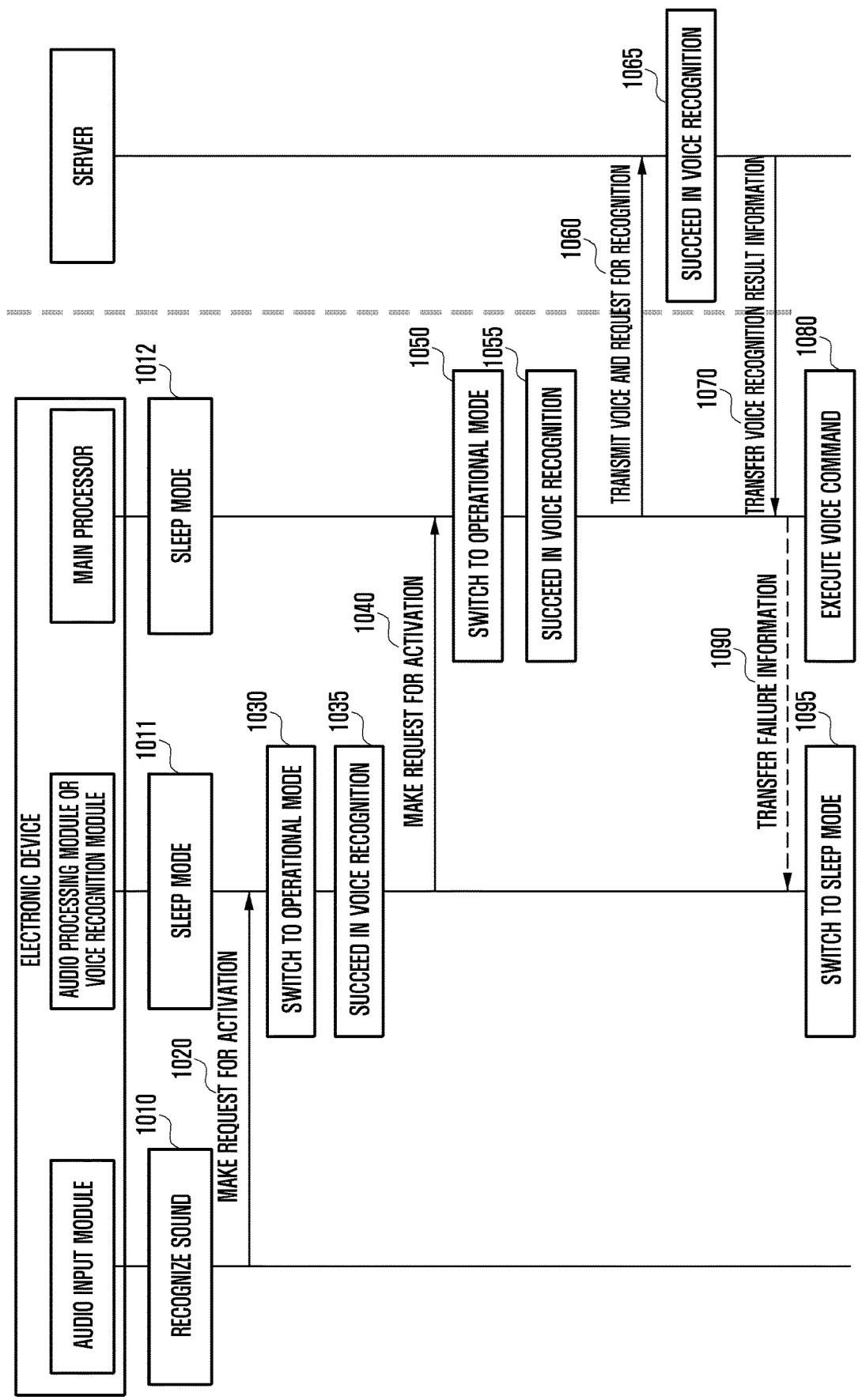
FIG. 10 is a flow diagram illustrating voice recognition between components of the electronic device according to an embodiment of the present disclosure.

FIG. 10 is a flow diagram illustrating voice recognition between components of the electronic device according to an embodiment of the present disclosure.

Referring to FIG. 10, the electronic device recognizes a sound by the audio input module in Step 1010. When the audio input module recognizes the sound, the audio input module of the electronic device transfers a driving signal to the audio processing module (or voice recognition module) to request activation in Step 1020. The audio processing module (or voice recognition module) operates in the sleep mode in Step 1011 and, when the driving signal is received from the audio input module, is woken up and switches to the operational mode in Step 1030. Then, the electronic device performs, by the audio processing module (or voice recognition module), the voice recognition on the audio signal acquired from the audio input module in Step 1035. When the audio processing module (or the voice recognition module) succeeds in the voice recognition, the electronic device transfers a driving signal to the main processor to request activation in Step 1040. The audio processing module (or voice recognition module) may recognize a voice trigger through the keyword recognition and the speaker recognition.

When the main processor of the electronic device receives the driving signal from the audio processing module in the sleep mode, the main processor is woken up and switches to the operational mode in Step 1050. When in Step 1055 the main processor of the electronic device succeeds in the voice recognition, the main processor transmits the audio signal and/or the voice signal to the server in Step 1060.

The main processor recognizes the voice trigger through the keyword recognition and the speaker recognition and distinguishes between the voice trigger and the voice command, which is input after the voice trigger. The main processor may transfer a voice signal corresponding to the voice command input after the voice trigger is recognized or transfer information on a time point at which the voice trigger and the voice command are separated. The main processor may transfer, to the server, at least one of the audio signal input from the audio input module based on an external sound and the voice signal extracted based on the voice recognition. Then, the server performs the voice recognition based on the audio signal and/or the voice signal transferred from the electronic device in Step 1065 and transfers result information on the voice recognition in Step 1070.

When the voice recognition is successful based on the result information on the voice recognition from the server and voice command information is received, the electronic device performs a function of the electronic device based on the voice command in Step 1080.

Meanwhile, when the audio processing module (or voice recognition module) fails in the voice recognition based on the result of the voice recognition, the electronic device switches the audio processing module (or voice recognition module) to the sleep mode in Step 1090 and keeps the main processor in the sleep mode. Meanwhile, when the electronic device receives failure information, which informs of the failure of the voice recognition, based on the result of the voice recognition from the server, the electronic device transfers voice recognition failure information to the audio processing module (or voice recognition module) in Step 1090 and switches the audio processing module (or voice recognition module) and the main processor to the sleep mode.

Figure 11:
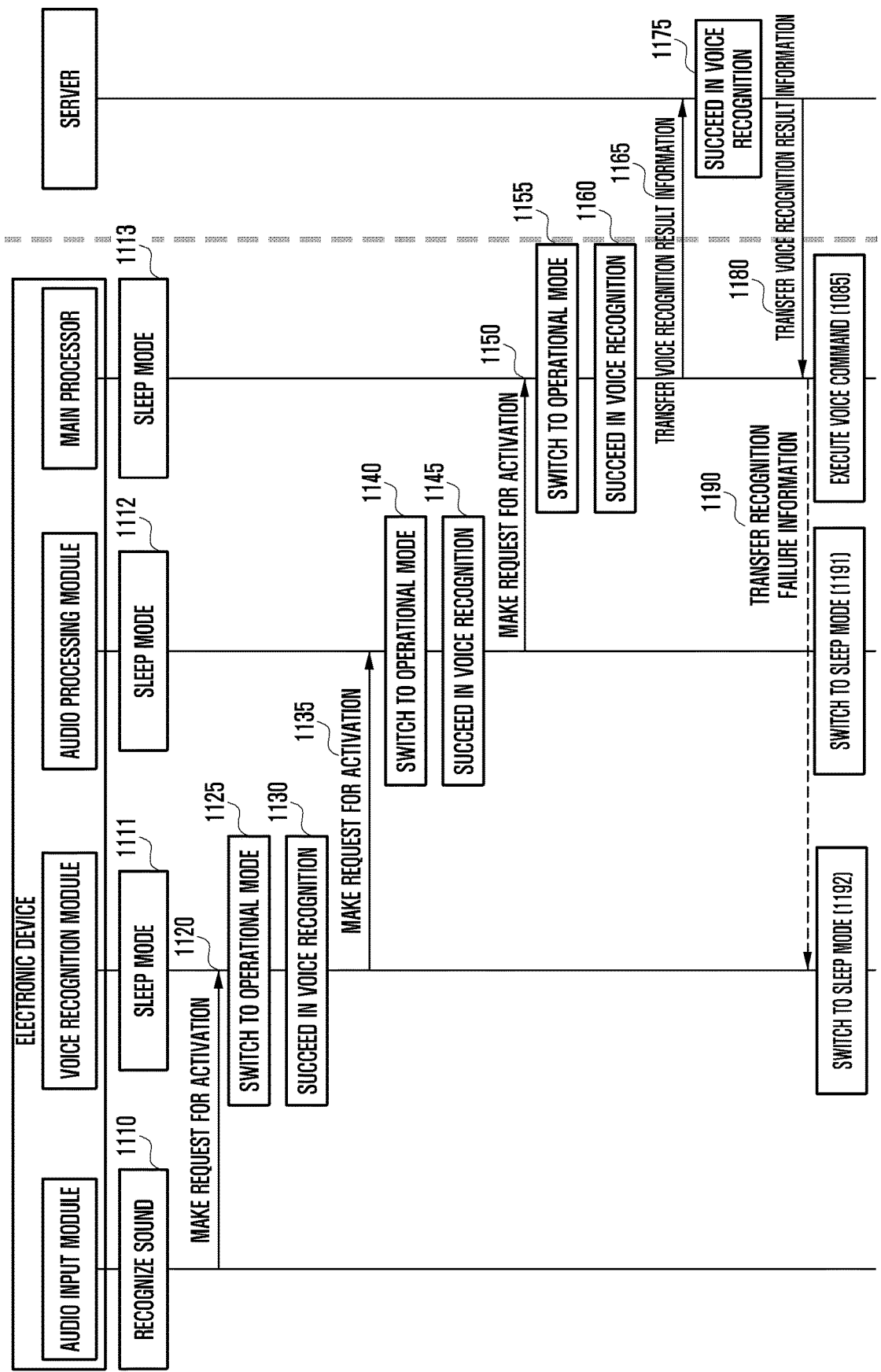
FIG. 11 is a flow diagram illustrating voice recognition between components of the electronic device according to an embodiment of the present disclosure.

FIG. 11 is a flow diagram illustrating voice recognition between components of the electronic device according to an embodiment of the present disclosure.

Referring to FIG. 11, the electronic device recognizes a sound by the audio input module in Step 1110. When the audio input module of the electronic device recognizes the sound, the audio input module transfers a driving signal to the voice recognition module to request activation in Step 1120. The voice recognition module operates in the sleep mode in Step 1111 and, when the driving signal is received from the audio input module, is woken up and switches to the operational mode in Step 1125. Then, voice recognition module of the electronic device performs the voice recognition on the audio signal acquired from the audio input module in Step 1130. When the voice recognition module succeeds in the voice recognition, the voice recognition module transfers a driving signal to the audio processing module to make a request for activation in Step 1135. The audio processing module operates in the sleep mode in Step 1112 and, when the driving signal is received from the voice recognition module, the audio processing module is woken up and switches to the operational mode in Step 1140. Then, the audio processing module of the electronic device performs the voice recognition in Step 1145. When the audio processing module succeeds in the voice recognition, the audio processing module transfers a driving signal to the main processor to request activation in Step 1150. The audio processing module (or voice recognition module) recognizes a voice trigger input by a registered speaker through the keyword recognition and the speaker recognition.

The main processor of the electronic device operates in the sleep mode in Step 1113 and, when the driving signal is received from the audio processing module, the main processor is woken up and switches to the operational mode in Step 1155. When the main processor of the electronic device performs the voice recognition in Step 1160 and the voice recognition is successful, the main processor transfers the audio signal and/or the voice signal to the server in Step

1165. The main processor recognizes the voice trigger input by the registered speaker through the keyword recognition and the speaker recognition and distinguishes between the voice trigger and the voice command, which is input after the voice trigger. The main processor transfers a voice signal corresponding to the voice command input after the voice trigger is recognized or transfers information on a time point at which the voice trigger and the voice command are separated, together with successive voice signals. Further, the main processor transfers, to the server, at least one of the audio signal input from the audio input module based on an external sound and the voice signal extracted based on the voice recognition.

Then, the server performs the voice recognition based on the audio signal and/or the voice signal transferred from the electronic device in Step 1175 and transfers result information on the voice recognition in Step 1180. The electronic device executes a function based on the voice command received from the server in Step 1085. When the successive audio signals or voice signals are transferred from the main processor, the server distinguishes the voice trigger and the voice command and performs the voice recognition. When the signal of the voice command is transferred from the main processor, the server performs the voice command recognition.

The voice command recognition performed by the server may be at least one of the keyword recognition, the speaker recognition, and the command recognition. As explained above, the electronic device may recognize limited voice commands, and the server may recognize many more voice commands, as compared to the main processor.

Meanwhile, when the electronic device receives failure information, which informs of the failure of the voice recognition, based on the result of the voice recognition from the server, the electronic device transfers voice recognition failure information to the audio processing module or voice recognition module in Step 1190 and switches the audio processing module or voice recognition module and the main processor to the sleep mode in Step 975 in FIG. 9, Step 1095 in FIG. 10, and Steps 1192 and 1191 in FIG. 11.

The voice recognition module of the electronic device primarily performs the voice recognition. When the voice recognition by the voice recognition module is successful, the audio processing module secondarily performs the voice recognition. When the voice recognition by the audio processing module is successful, the main processor tertiarily performs the voice recognition. Further, when the main processor of the electronic device succeeds in the voice recognition, the main processor requests that the server quaternarily performs the voice recognition.

Hereinafter, embodiments of a User Interface (UI) screen in the voice recognition operation of the electronic device will be described.

Figure 12A:
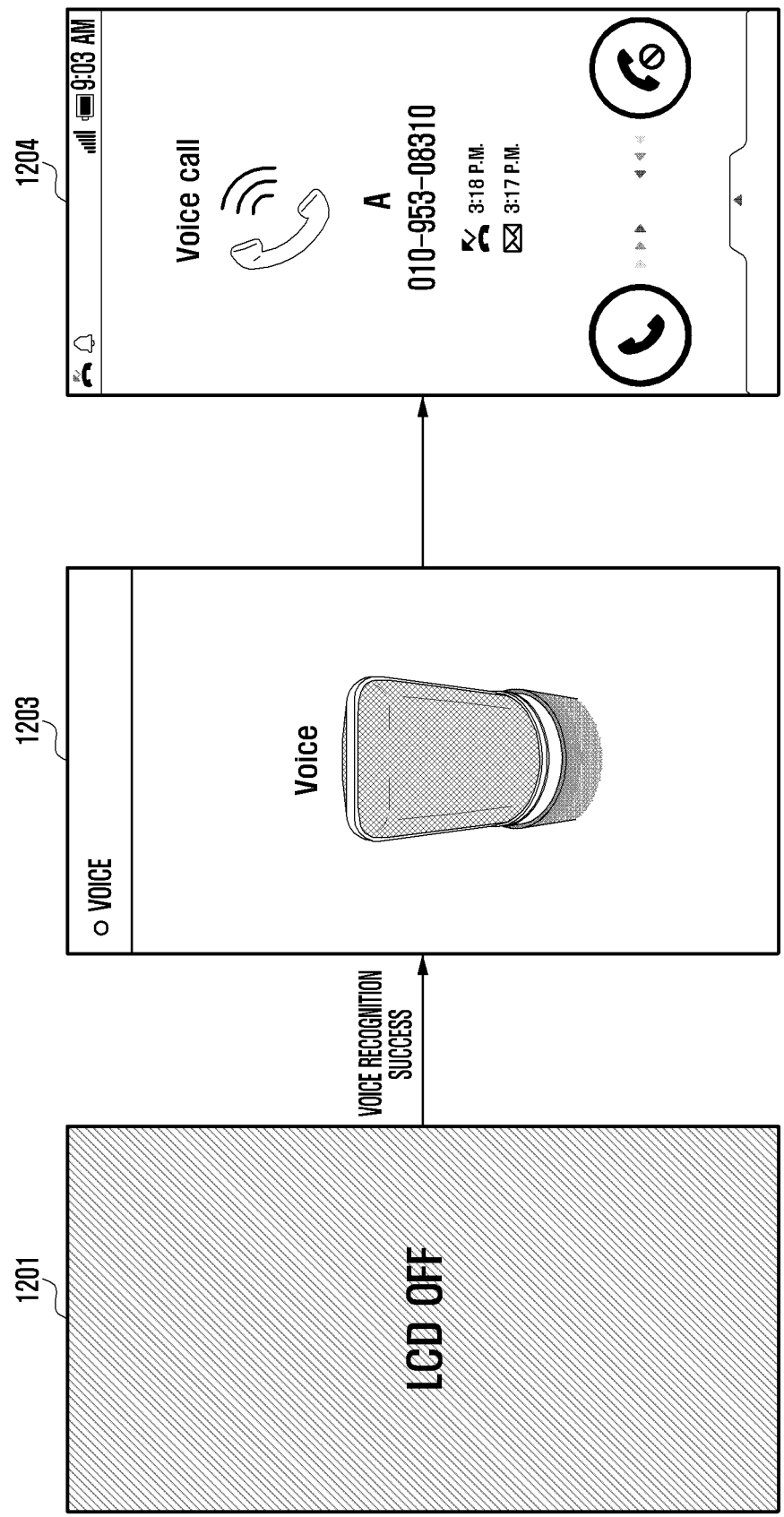
FIG. 12A provides an example of a voice recognition operation screen of the electronic device according to an embodiment of the present disclosure.
Figure 12B:
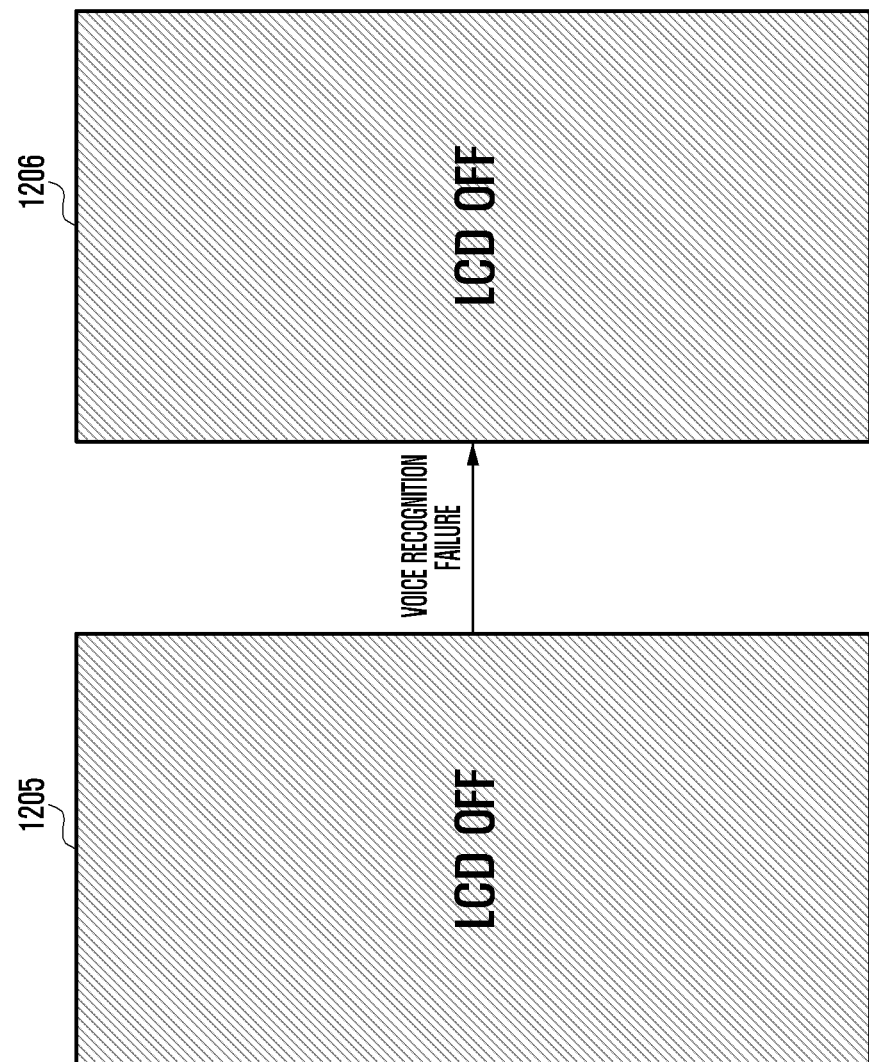
FIG. 12B provides an example of a voice recognition operation screen of the electronic device according to an embodiment of the present disclosure.

FIG. 12A provides an example of a voice recognition operation screen of the electronic device according to an embodiment of the present disclosure. FIG. 12B provides an example of a voice recognition operation screen of the electronic device according to an embodiment of the present disclosure.

Referring to FIGS. 12A and 12B, when the main processor switches from the sleep mode to the operational mode and performs voice recognition, the electronic device controls a turn-on/turn-off operation of the display module.

As indicated by reference numeral 1201 (FIG. 12A), while the audio input module acquires the audio signal and the audio processing module (or voice recognition module) performs voice recognition, the main processor of the electronic device operates in the sleep mode and the display module is in the off state. While the main processor is activated by the driving signal from the audio processing module (or voice recognition module) and performs the voice recognition, the main processor controls the display module to maintain the off state.

When the main processor of the electronic device succeeds in the voice recognition, the main processor turns on the display module and display a voice recognition operation screen, e.g., a voice recognition application screen) as indicated by reference numeral 1203 (FIG. 12A), and then sequentially performs a function corresponding to a voice command and controls output of a function execution screen as indicated by reference numeral 1204 (FIG. 12A).

For example, when the main processor of the electronic devices succeeds in the recognition of a voice trigger (for example, "Hi Galaxy") of a registered speaker based on the result of the voice recognition and succeeds in the recognition of a voice command (for example, "turn on camera") that is input after the voice trigger, the main processor controls the display module to output the voice recognition application screen 1203 and then the function execution screen 1204 (FIG. 12A).

Alternatively, when the main processor of the electronic device succeeds in the voice recognition based on the result of the voice recognition, the main processor turns on the display module, to execute a function corresponding to the voice command, and directly displays the function execution screen.

The main processor of the electronic device controls the display module to maintain the turned-off state, as indicated by reference numeral 1205 (FIG. 12B), while the voice recognition is performed. When the voice recognition fails based on a result of the voice recognition, the main processor may switch from the operational mode to the sleep mode and maintains the turned-off state, as indicated by reference numeral 1206 (FIG. 12B).

Figure 13B:
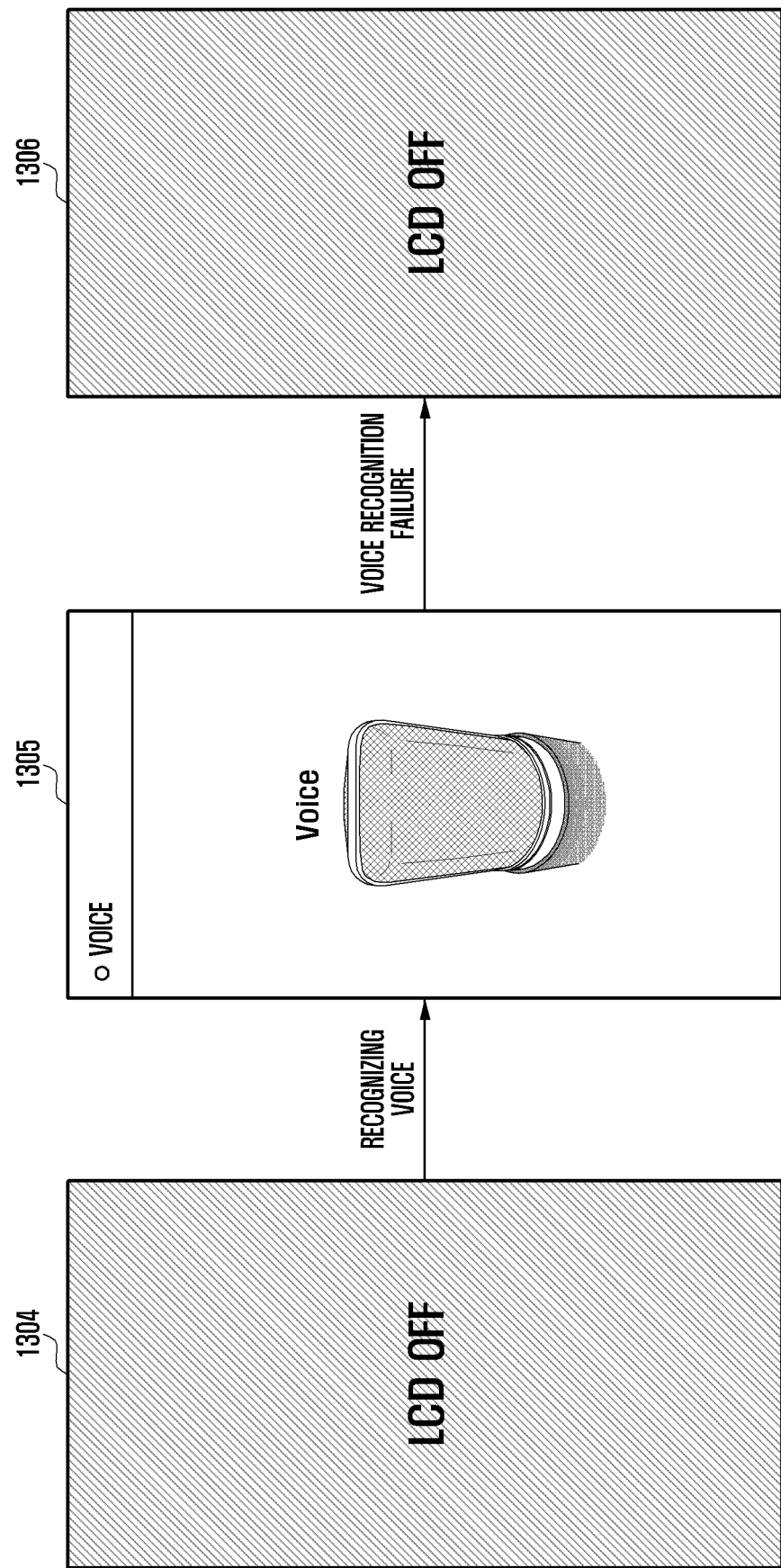
FIG. 13B provides an example of a voice recognition operation screen of the electronic device according to an embodiment of the present disclosure.

FIG. 13A provides an example of a voice recognition operation screen of the electronic device according to an embodiment of the present disclosure. FIG. 13B provides an example of a voice recognition operation screen of the electronic device according to an embodiment of the present disclosure.

Referring to FIGS. 13A and 13B, the electronic device acquires an audio signal from the audio input module. While the audio processing module (or voice recognition module) performs the voice recognition, the main processor operates in the sleep mode, so that the display module may be in the off state, as indicated by reference numeral 1301 (FIG. 13A). When the main processor is activated by the driving signal from the audio processing module (or voice recognition module), the main processor turns on the display module and displays the voice recognition operation screen indicating that the voice recognition is being performed, as indicated by reference numeral 1302 (FIG. 13A).

When the voice recognition is successful, the main processor executes a function corresponding to the voice command, switches the voice recognition operation screen to the function execution screen, and displays the switched function execution screen, as indicated by reference numeral 1303 (FIG. 13A).

As shown in FIG. 13B, the display module is maintained in the off state, as indicated by reference numeral 1304 while the audio processing module (or voice recognition module) of the electronic device performs the voice recognition.

When the main processor of the electronic device is activated for the voice recognition function, the main processor may turn on the display module and, while the voice recognition is performed, display the voice recognition operation screen indicating that the voice recognition is being performed, as indicated by reference numeral 1305. When the voice recognition fails based on a result of the voice recognition while the voice recognition operation screen is displayed during the voice recognition, the main processor turns off the display module and switches from the operational mode to the sleep mode as indicated by reference numeral 1306.

A storage medium having commands stored therein may also be provided. The commands are configured to allow one or more processors to perform one or more operations when being executed by the one or more processors. The one or more operations include recognizing a sound and making a request for activating a voice recognition module, by an audio input module; when the voice recognition module is activated in response to the activation request from the audio input module, performing first voice recognition on an audio signal transferred from the audio input module; when the first voice recognition by the voice recognition module is successful, making a request for voice recognition to a processor; and performing second voice recognition on an audio signal transferred from the voice recognition module, by the processor.

According to the present disclosure, when voice recognition is primarily performed through a low performance module having small current consumption and the primary voice recognition is successful, the voice recognition is secondarily performed through a high performance module having a relatively high recognition rate, so that the recognition rate of the voice recognition can be improved and current consumption also can be improved through phased activation of components of the electronic device.

While the present disclosure has been shown and described with reference to certain embodiments thereof, it will be understood by those skilled in the art that various changes in form and detail may be made therein without departing from the spirit and scope of the invention as defined by the appended claims, and equivalents thereof.

What is claimed is:

1. An electronic device comprising:
   a display;
   an audio input processor configured to:
     receive an audio signal, and
     transfer a first driving signal to an audio recognition processor when a frequency of the audio signal corresponds to a preset frequency band,
   the audio recognition processor configured to:
     perform a first voice recognition on the audio signal in response to the first driving signal, the first voice recognition including a speaker recognition,
     recognize a voice trigger of a registered speaker in the audio signal, and
     transfer a second driving signal to a main processor based on a result of the first voice recognition, and
   the main processor configured to:
     perform a second voice recognition based on at least one of a voice signal by the first voice recognition and the audio signal, in response to the second driving signal, the second voice recognition including a command recognition,
     execute an application associated with a voice command based on a result of the second voice recognition, and
     maintain an off state of the display during the second voice recognition, and turn on the display to display an execution screen of the application in response to successful recognition of the second voice.

2. The electronic device of claim 1, wherein the main processor performs the second voice recognition by switching from a sleep mode to an operational mode, based on the second driving signal.

3. The electronic device of claim 1, wherein the main processor recognizes the voice trigger of the registered speaker for triggering a voice recognition function for the audio signal and recognizes the voice command of the registered speaker for executing a voice-based function for an audio signal input.

4. The electronic device of claim 1, wherein the audio recognition processor switches from a sleep mode to an operational mode in response to the first driving signal.

5. The electronic device of claim 1, further comprising:
   an audio processor for processing audio data transmitted/received to/from the main processor,
   wherein the audio recognition processor is included in an audio input module for receiving the audio signal.

6. The electronic device of claim 5, wherein the audio input module remains activated regardless of whether the main processor is in an operational mode or a sleep mode.

7. The electronic device of claim 3, wherein the main processor recognizes the voice trigger and the voice command of the registered speaker.

8. The electronic device of claim 1, wherein the audio recognition processor buffers the voice signal through the first voice recognition of the audio signal, and
   wherein the audio recognition processor transfers the buffered voice signal and audio signal to the main processor, if the main processor switches from a sleep mode to an operational mode.

9. The electronic device of claim 1, wherein, if the first voice recognition fails, the audio recognition processor switches from an operational mode to a sleep mode and, if the second voice recognition fails, the main processor switches from the operational mode to the sleep mode.

10. The electronic device of claim 1, further comprising:
    a transceiver configured to communicate with a voice recognition server,
    wherein, if the second voice recognition is successful, the transceiver transmits, for a third voice recognition, at least one of a voice signal by the second voice recognition or the audio signal to the voice recognition server, and receives result information on the third voice recognition from the voice recognition server.

11. The electronic device of claim 1,
    wherein, if the second voice recognition is successful while the display is in an off state, the main processor turns on the display to display a function execution screen and, if the second voice recognition fails, the display remains in the off state.

12. The electronic device of claim 1,
    wherein, while the second voice recognition is performed, the main processor controls the display to output a screen indicating that the second voice recognition is being performed, and to display a function execution screen if the second voice recognition succeeds and to turn off the display if the second voice recognition fails.

13. A method of performing voice recognition by an electronic device, the method comprising:
    receiving an audio signal;
    transferring, by an audio input processor, a first driving signal to an audio recognition processor when a frequency of the audio signal corresponds to a preset frequency band;

performing first voice recognition on the audio signal in response to the first driving signal, by the audio recognition processor, the first voice recognition including a speaker recognition;

recognizing a voice trigger of a registered speaker in the audio signal;

transferring a second driving signal to a main processor based on a result of the first voice recognition, by the audio recognition processor;

performing second voice recognition based on at least one of a voice signal by the first voice recognition and the audio signal in response to the second driving signal, by the main processor, the second voice recognition including a command recognition;

executing, by the main processor, an application associated with a voice command based on a result of the second voice recognition; and maintaining, by the main processor, an off state of a display of the electronic device while the second voice recognition, and turning on the display to display an execution screen of the application in response to successful recognition of the second voice.

14. The method of claim 13, wherein performing the first voice recognition comprises switching from a sleep mode to an operational mode, based on the second driving signal by the main processor.

15. The method of claim 13, wherein recognizing the voice trigger of the registered speaker comprises triggering a voice recognition function based on the audio signal, and recognizing a command voice for executing a voice-based function for an audio signal input after recognition of the voice trigger is successful.

16. The method of claim 13, further comprising:
switching the audio recognition processor from a sleep mode to an operational mode in response to the first driving signal provided by the audio input processor.

17. The method of claim 13, further comprising:
switching the audio recognition processor from an operation mode to a sleep mode if the first voice recognition fails; and
switching the main processor from an operation mode to a sleep mode if the second voice recognition fails.

18. The method of claim 13, further comprising:
switching the main processor from a sleep mode to an operation mode in response to the second driving signal provided by the audio recognition processor;
buffering, by the audio recognition processor, the voice signal through the first voice recognition of the audio signal; and
transferring, by the audio recognition processor, the buffered voice signal and the audio signal to the main processor if the second processor switches from a sleep mode to an operational mode.

19. The method of claim 13, wherein performing the second voice recognition comprises:
performing a function of the electronic device corresponding to the voice command through the second voice recognition if the main processor succeeds in the second voice recognition; and
switching to a sleep mode if the main processor fails in the second voice recognition.

20. The method of claim 16, wherein performing the second voice recognition comprises:
if the main processor succeeds in the second voice recognition, transmitting the audio signal and the voice signal based on the second voice recognition to a voice recognition server for a fourth voice recognition;
when the voice command according to the fourth voice recognition is received from the voice recognition server, performing a function of the electronic device corresponding to the received voice command; and
if failure information on the fourth voice recognition is received from the voice recognition server, switching the main processor to a sleep mode.

* * * * *